(12) United States Patent
Ogawa et al.

(10) Patent No.: US 11,267,377 B2
(45) Date of Patent: Mar. 8, 2022

(54) MOUNTING STRUCTURE OF AUXILIARY MEMBER AND VEHICLE SEAT WITH AUXILIARY MEMBER

(71) Applicants: TOYOTA JIDOSHA KABUSHIKI KAISHA, Aichi-ken (JP); TOYOTA BOSHOKU KABUSHIKI KAISHA, Aichi (JP)

(72) Inventors: Takashi Ogawa, Toyota (JP); Satoshi Nonoyama, Toyota (JP)

(73) Assignees: TOYOTA JIDOSHA KABUSHIKI KAISHA, Aichi-ken (JP); TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/987,398

(22) Filed: Aug. 7, 2020

(65) Prior Publication Data

US 2021/0078467 A1   Mar. 18, 2021

(30) Foreign Application Priority Data

Sep. 13, 2019 (JP) .............................. JP2019-167139

(51) Int. Cl.
*B60N 2/30* (2006.01)
*B60N 2/02* (2006.01)
*B60N 2/75* (2018.01)
*B60N 2/24* (2006.01)

(52) U.S. Cl.
CPC ......... *B60N 2/3045* (2013.01); *B60N 2/0224* (2013.01); *B60N 2/245* (2013.01); *B60N 2/767* (2018.02); *B60N 2/79* (2018.02)

(58) Field of Classification Search
CPC ........ B60N 2/3045; B60N 2/767; B60N 2/79; B60N 2/0224; B60N 2/245
See application file for complete search history.

(56) References Cited

U.S. PATENT DOCUMENTS

| | | | | |
|---|---|---|---|---|
| 5,681,079 A | * | 10/1997 | Robinson | B60N 2/3013 297/61 |
| 5,913,566 A | * | 6/1999 | Stauffer | B60N 2/3011 296/190.1 |

(Continued)

FOREIGN PATENT DOCUMENTS

JP            201580658 A       4/2015

*Primary Examiner* — Philip F Gabler
(74) *Attorney, Agent, or Firm* — Hauptman Ham, LLP

(57) ABSTRACT

An auxiliary member attachment structure for a vehicle seat. The auxiliary member attachment structure includes an auxiliary member at an outer side of the vehicle seat. The vehicle seat has a seat cushion that is capable of transitioning from a seating position to a storage position aligned with a seat back. The auxiliary member being rotatable, about a shaft in the vehicle seat extending along the seat width direction, between a reference position at which the auxiliary member is upright and a holding position at which the auxiliary member is rotated closer to a front side of a vehicle. The auxiliary member attachment structure further includes a rotation restriction unit configured to restrict rotation of the auxiliary member at the reference position when the seat cushion is at the seating position, and cease the restriction of rotation of the auxiliary member when the seat cushion is at the storage position.

12 Claims, 16 Drawing Sheets

(56) References Cited

U.S. PATENT DOCUMENTS

| | | | |
|---|---|---|---|
| 7,252,337 B2* | 8/2007 | Hofmann | B60N 2/20 |
| | | | 297/331 |
| 7,478,860 B2* | 1/2009 | Lawall | B60N 2/3011 |
| | | | 296/65.01 |
| 8,128,162 B2* | 3/2012 | Gerhardt | B60N 2/818 |
| | | | 297/61 |
| 8,197,001 B2* | 6/2012 | Grable | B60N 2/859 |
| | | | 297/61 |
| 10,773,613 B2* | 9/2020 | Nakamura | B60N 2/161 |
| 10,889,218 B2* | 1/2021 | Vetere, II | B60N 2/203 |
| 2018/0015854 A1* | 1/2018 | Song | B60N 2/22 |
| 2020/0189432 A1* | 6/2020 | Kelly | B60N 2/757 |

\* cited by examiner

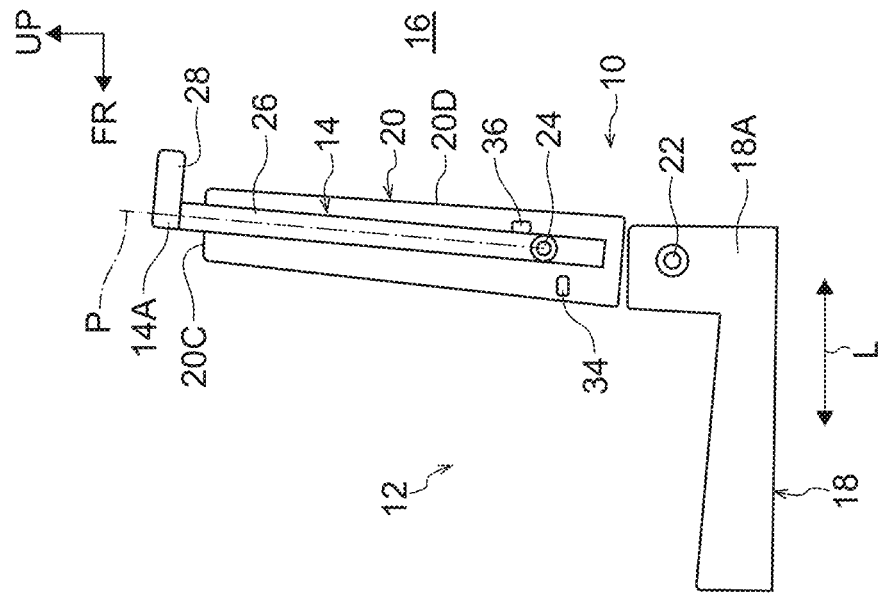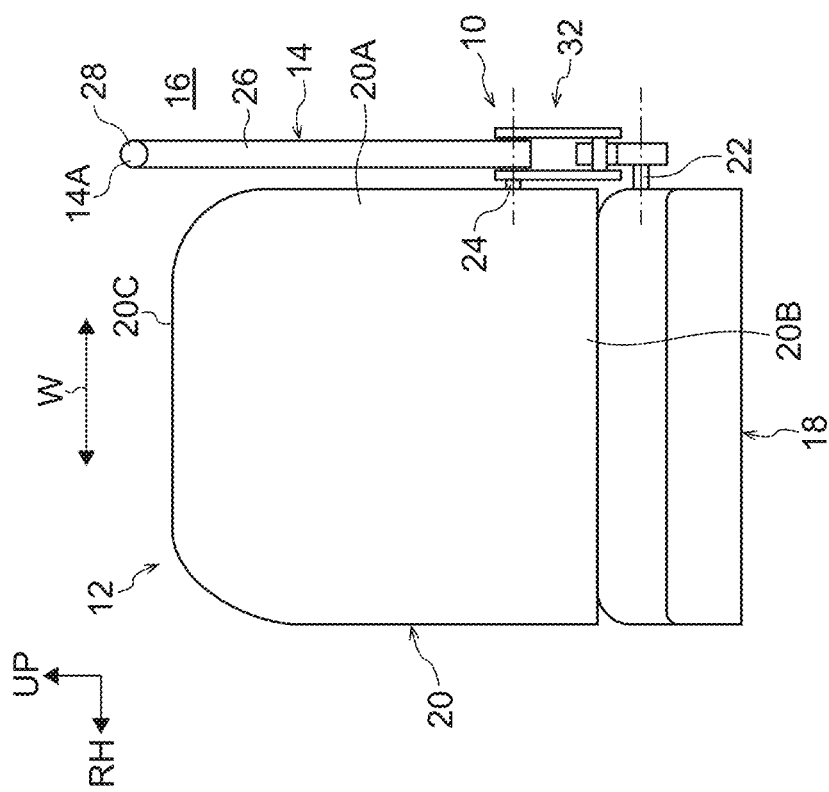

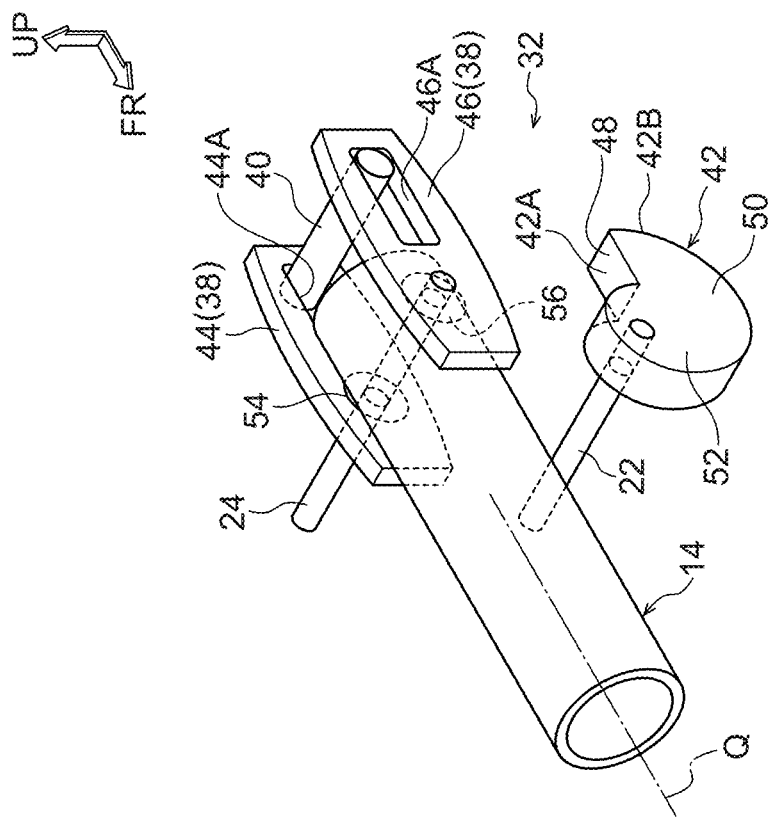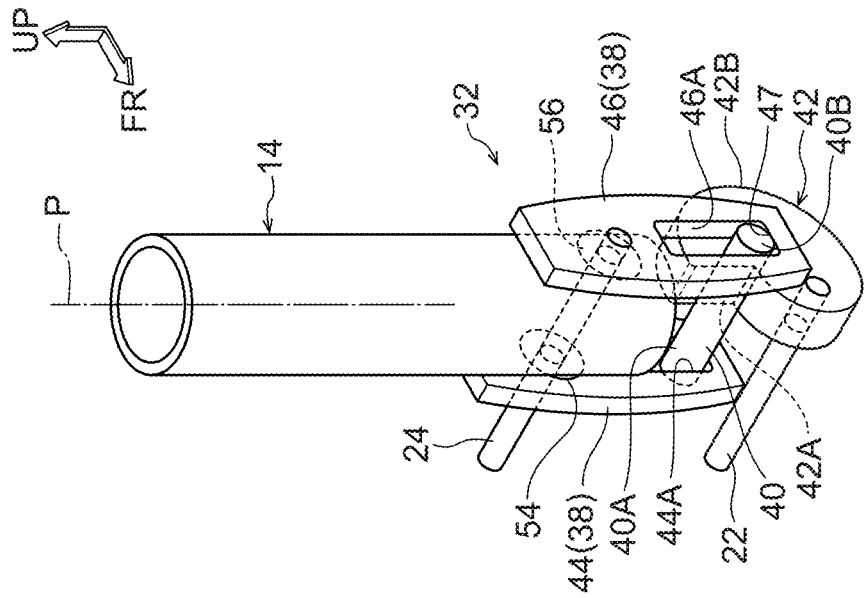

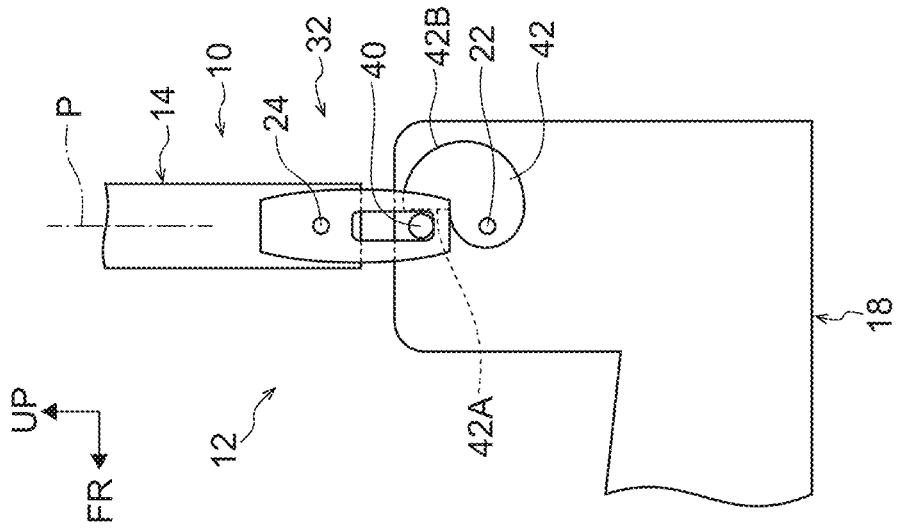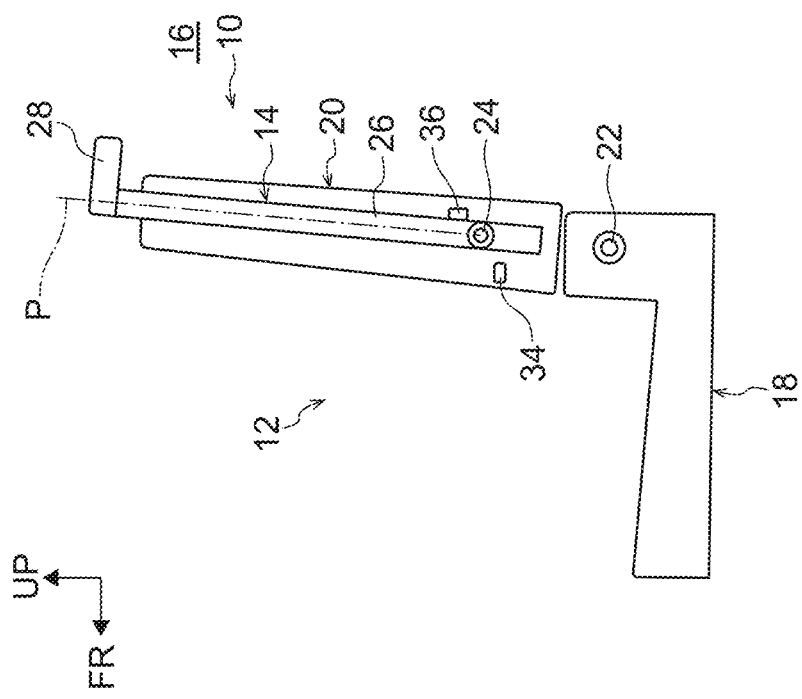

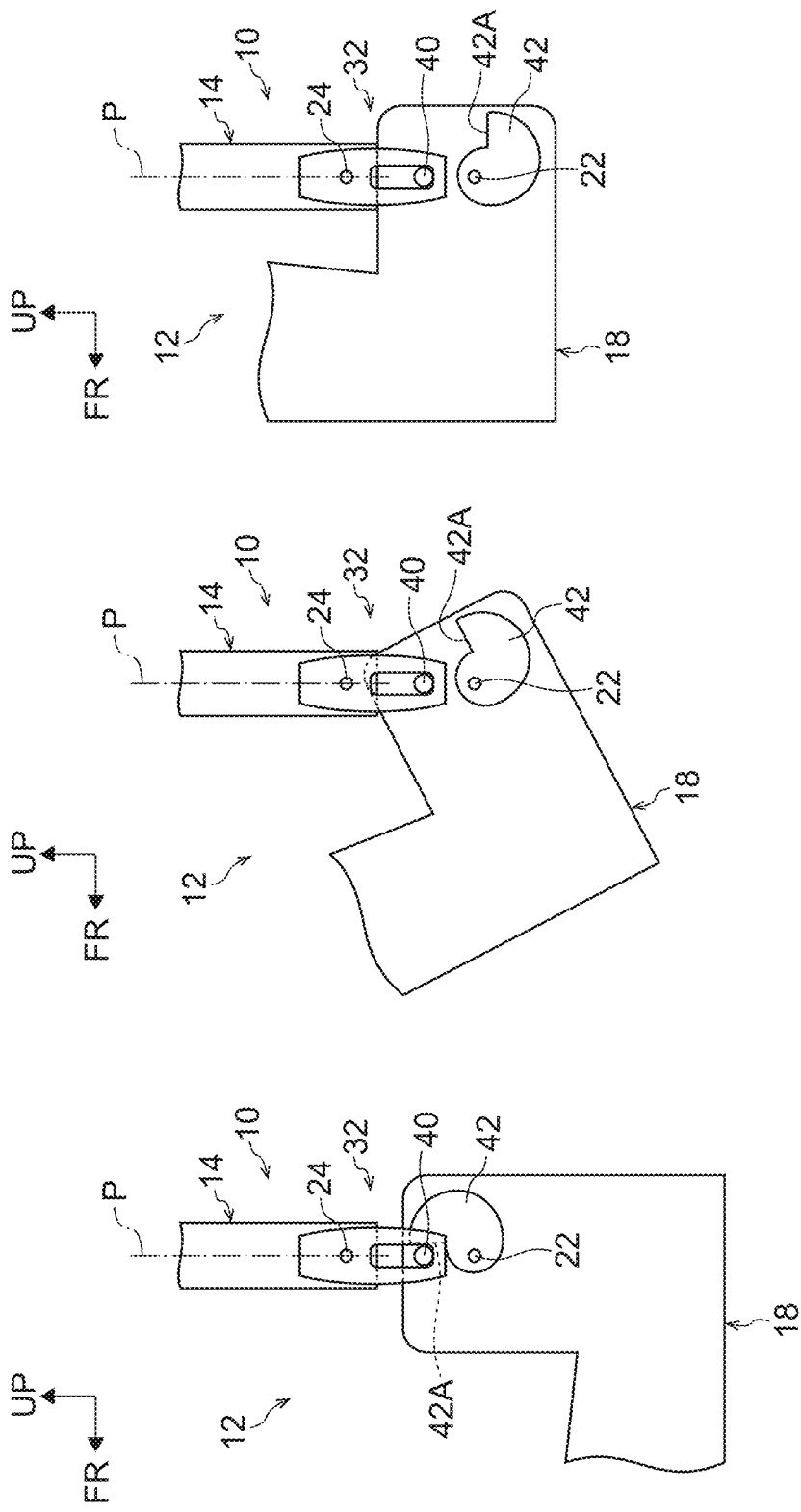

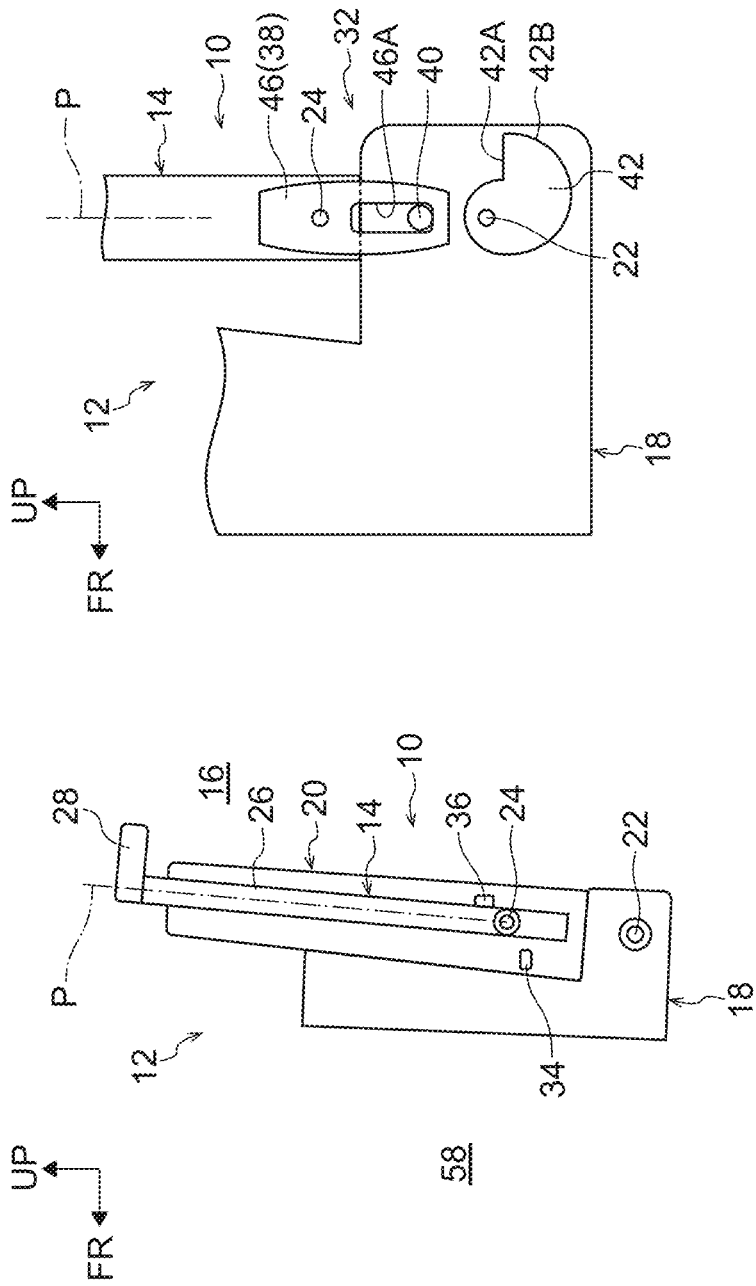

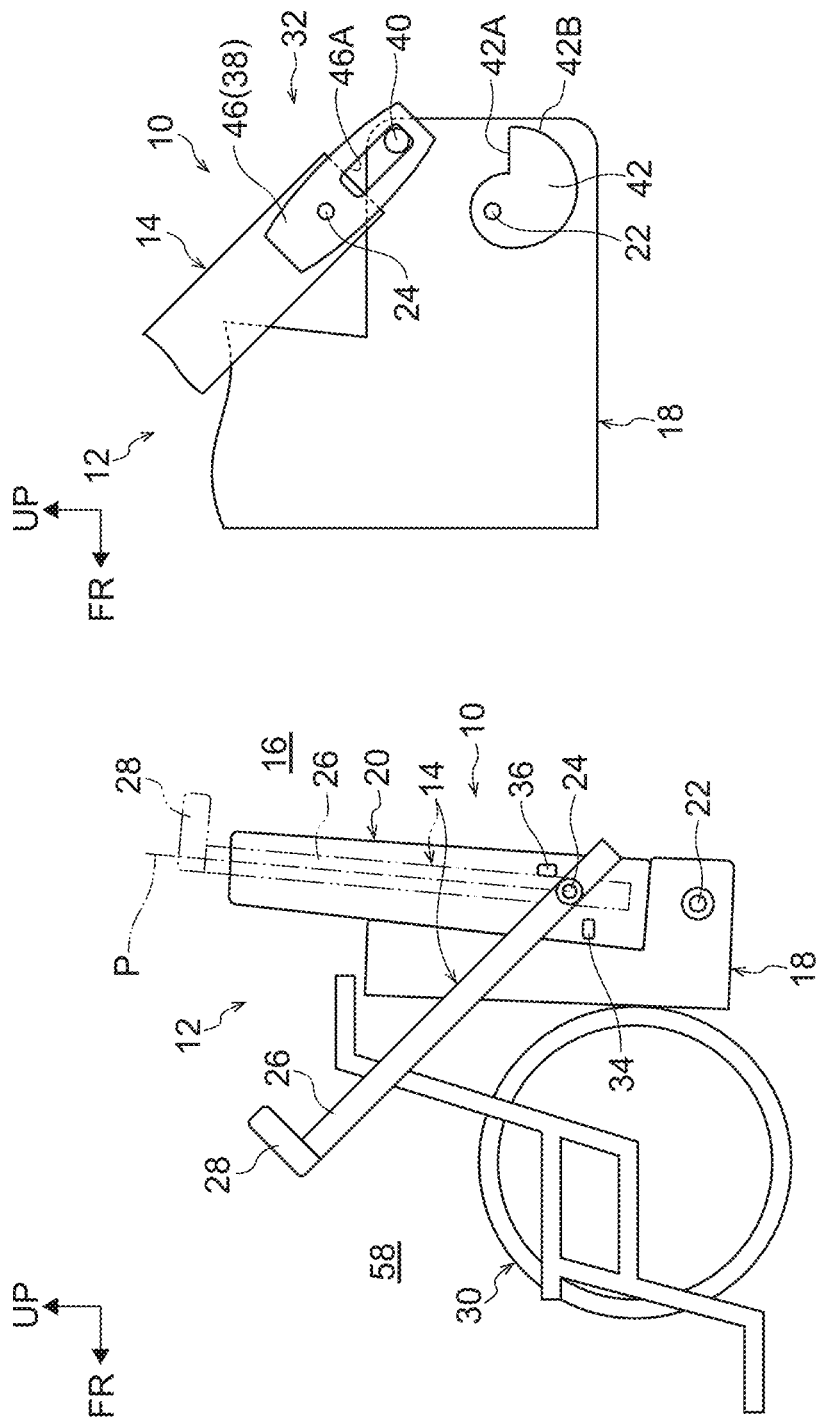

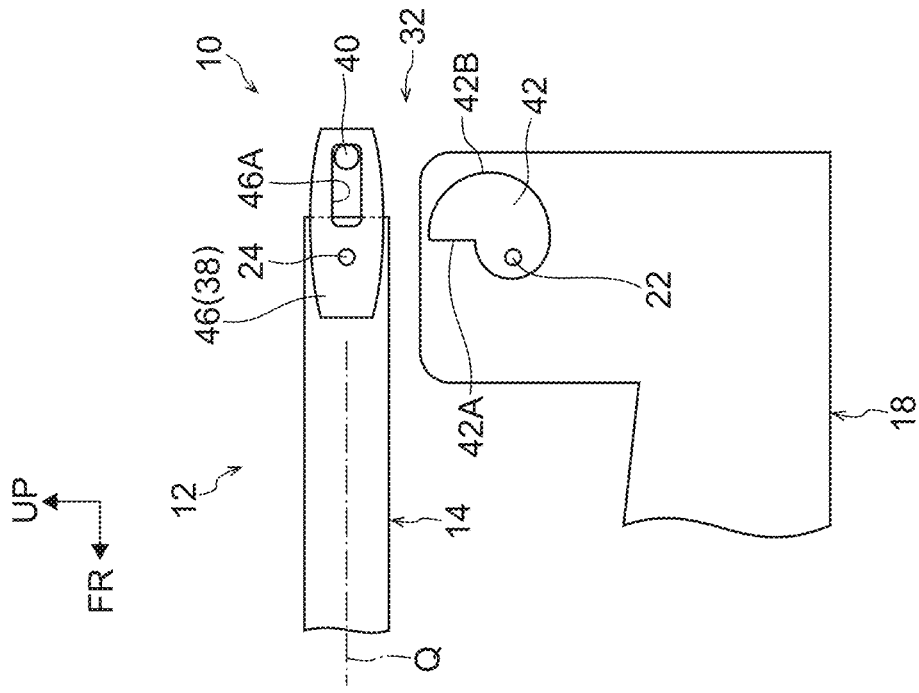
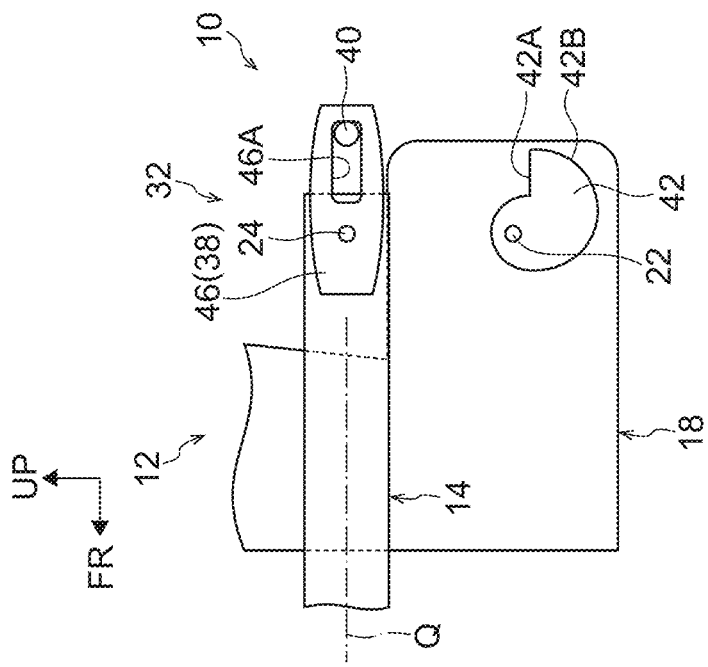

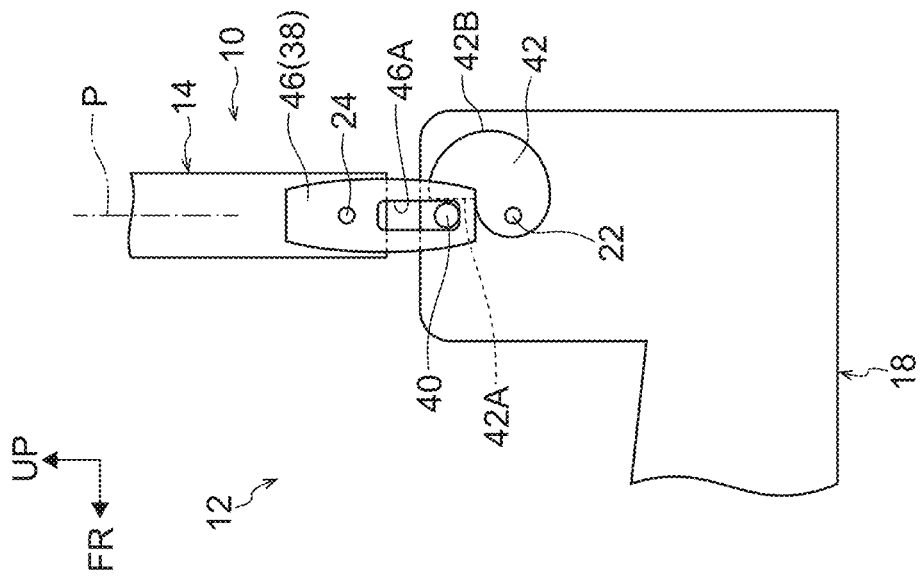
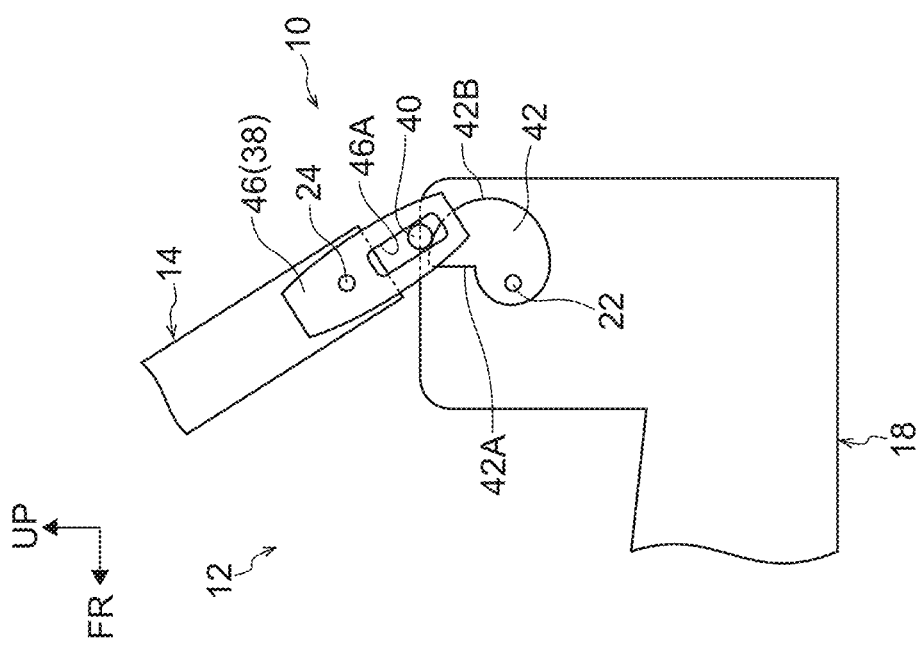

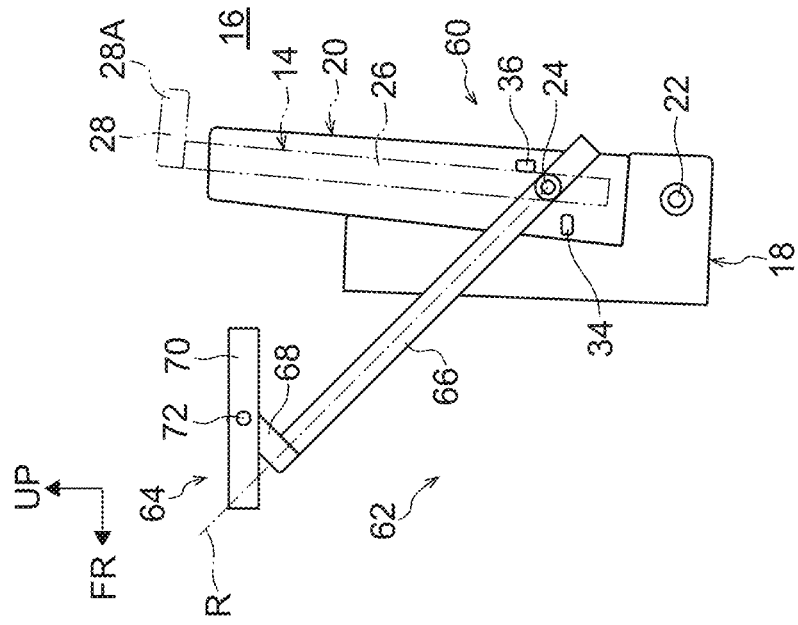
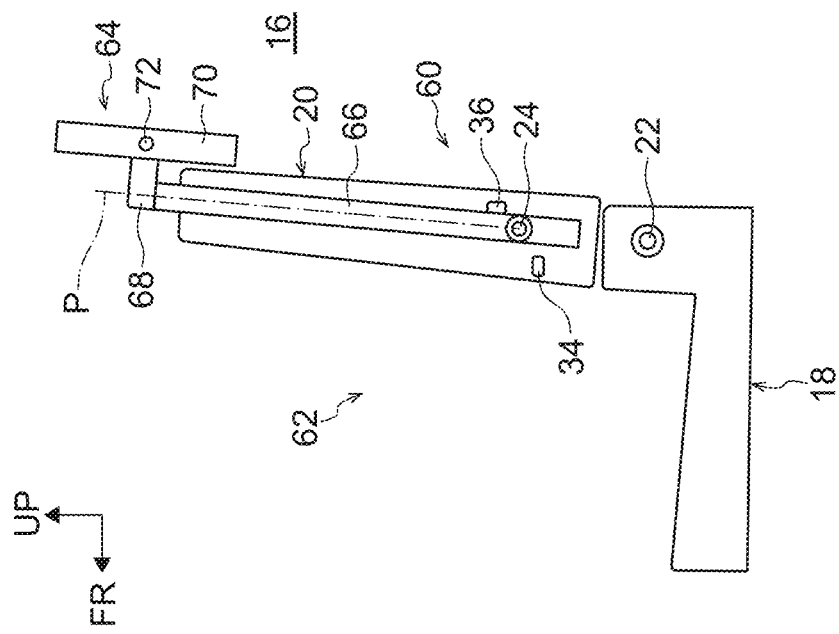

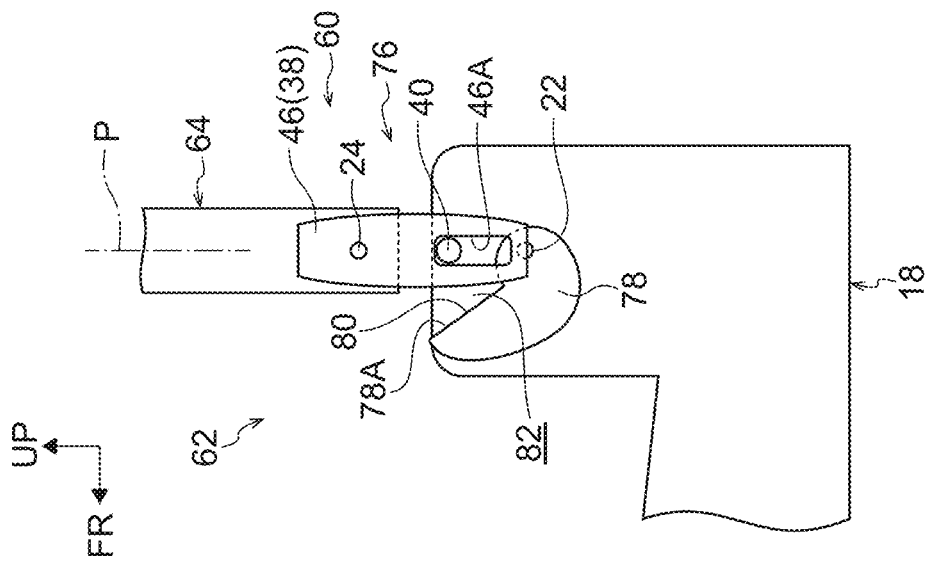
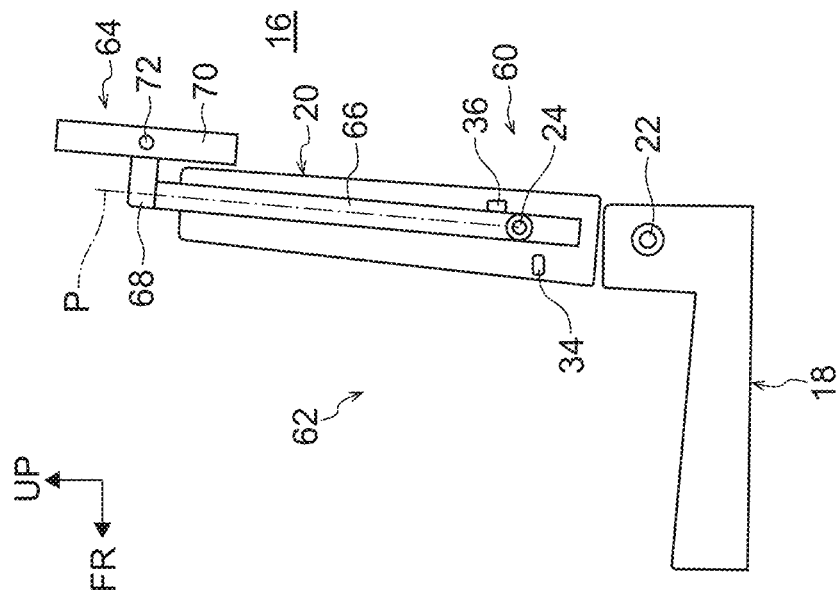

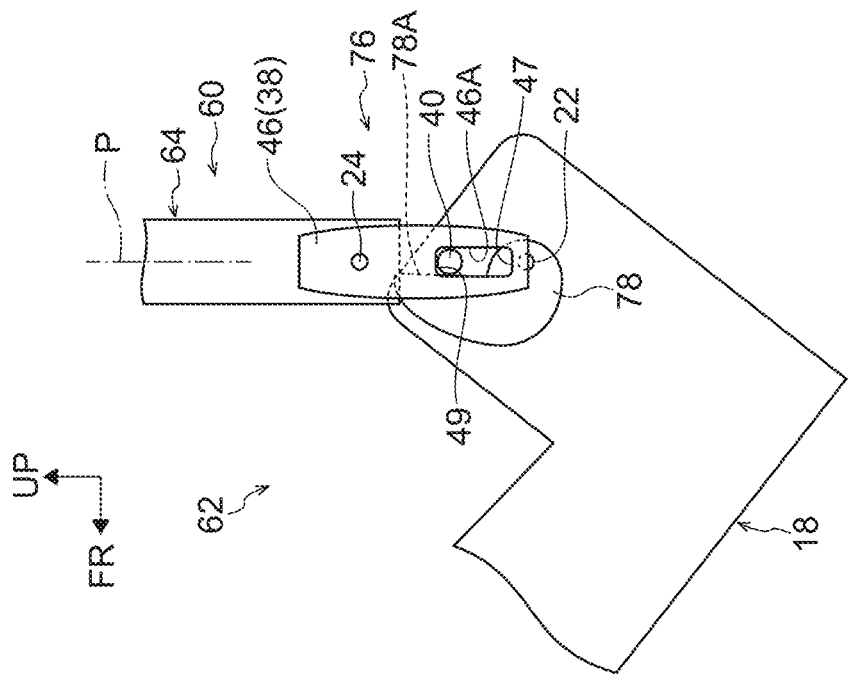
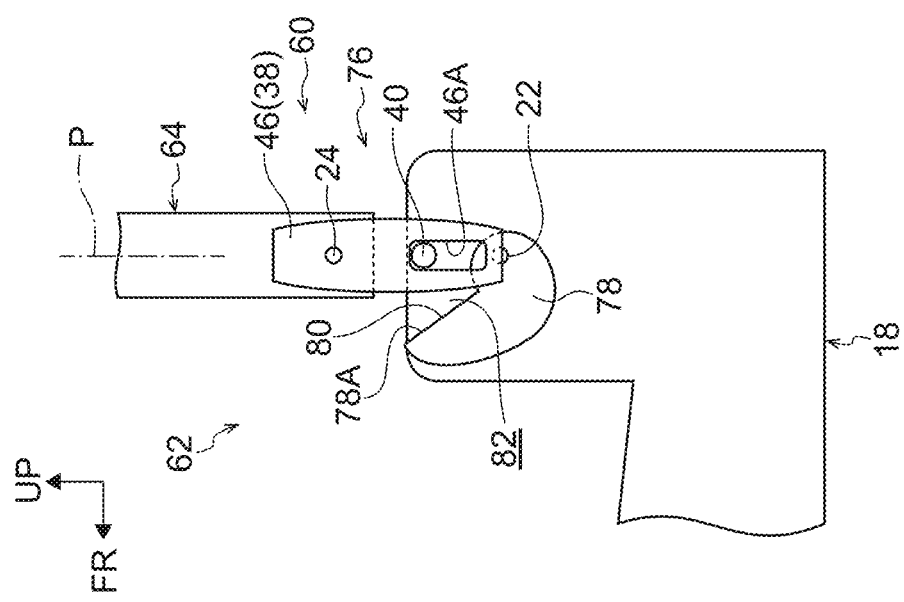

MOUNTING STRUCTURE OF AUXILIARY MEMBER AND VEHICLE SEAT WITH AUXILIARY MEMBER

CROSS-REFERENCE TO RELATED APPLICATION

This application claims priority under 35 USC 119 from Japanese Patent Application No. 2019-167139 filed Sep. 13, 2019, the disclosure of which is incorporated by reference herein in its entirety.

BACKGROUND

Technical Field

The present disclosure relates to a mounting structure of an auxiliary member and a vehicle seat with the auxiliary member.

Related Art

Japanese Patent Application Laid-Open No. 2015-80658 discloses a technique whereby, in a handrail attached to a vehicle in order to be gripped by the occupant of a wheelchair carried in a vehicle for a handicapped person, an elastic body is jointly fastened to a fastening portion of the handrail and rattling of the handrail is suppressed.

In the above technology, a recess is formed on both sides in a vehicle width direction of a floor panel in a vehicle interior, a pair of legs connected to a seat cushion of a vehicle seat are attached in the recesses, and the seat cushion is rotatable toward the front side in the front-rear direction of the seat. Further, the handrail stands upright from mounting portions provided on both outer sides in the vehicle width direction of the floor panel.

SUMMARY

However, if attachment portions of auxiliary members such as handrails are provided on both outer sides in the vehicle width direction of the floor panel, the space in the vehicle width direction at the vehicle interior becomes more narrow, so that when the passenger in the wheelchair moves or turns around in the wheelchair in the vehicle interior, the wheelchair and the auxiliary members may interfere with each other.

In view of the above, the present disclosure provides a mounting structure of an auxiliary member and a vehicle seat with an auxiliary member that are capable of suppressing interference between the auxiliary member and the wheelchair when the wheelchair is moved or turned back in the vehicle interior.

An auxiliary member attachment structure for a vehicle seat of at least one aspect of the present disclosure includes: an auxiliary member that is configured to be provided at an outer side in a seat width direction of the vehicle seat, the seat has a seat cushion that is able to be flipped up from a seating position to a storage position that is aligned with a seat back, the auxiliary member being rotatable, about a shaft in the vehicle seat extending along the seat width direction, between a reference position at which the auxiliary member is upright along a seat vertical direction and a holding position at which the auxiliary member is rotated closer to a front side of a vehicle in a seat front-rear direction from the reference position; and a rotation restriction unit that is configured to be provided at the vehicle seat, the rotation restriction unit restricts rotation of the auxiliary member at the reference position in a case in which the seat cushion is at the seating position, and the rotation restriction unit ceases restriction of rotation of the auxiliary member in a case in which the seat cushion is at the storage position.

In the auxiliary member attachment structure of the present aspect, the auxiliary member and the rotation restricting unit are provided at the vehicle seat that is configured such that the seat cushion can be flipped upward so as to align with the seat back.

The auxiliary member is provided at an outer side in the seat width direction of the vehicle seat, is rotatable about the shaft provided in the vehicle seat extending along the seat width direction, and the auxiliary member able to stand upright along the seat vertical direction at the reference position.

Further, the rotation restriction unit is configured to restrict rotation of the auxiliary member at the reference position in a case in which the vehicle seat is at the seating position, and to cease restriction of rotation of the auxiliary member in a case in which the seat cushion is at the storage position. In this way, the auxiliary member is configured such that when restriction of rotation of the auxiliary member is ceased, the auxiliary member is rotatable, about the shaft, between the reference position and the holding position at which the auxiliary member is rotated closer to the front side of the vehicle in the seat front-rear direction relative to the reference position.

Examples of the "auxiliary member" provided at the vehicle seat include a handrail that is gripped by an occupant or a table that is used by an occupant. In addition, "the seat cushion is able to be flipped upward" here refers to a state other than a seating state of the seat cushion, and is not limited to a state in which the seat cushion is stored (a storage position of the seat cushion).

Further, "restriction of rotation" means that in an auxiliary member that is rotatable about a shaft extending along the seat width direction, rotation in at least one direction along the seat front-rear direction from the reference position is restricted.

In the storage position of the seat cushion in which the seat cushion is flipped up and aligned with the seat back, a space at a front side of the seat back (that is, at the front side of the stored seat cushion) becomes unoccupied. Therefore, a wheelchair can be positioned in this space.

In the present aspect, when the seat cushion is flipped up, restriction of rotation of the auxiliary member is ceased. Therefore, in a state in which the wheelchair is arranged in front of the seat back, by rotating the auxiliary member toward the front side from the reference position, the wheelchair occupant sitting in the wheelchair can grip the auxiliary member as a handrail.

Further, in the present aspect, the auxiliary member is provided at an outer side, in the seat width direction, of the vehicle seat in the upright state in the seat vertical direction. Therefore, even when the wheelchair is moved in the front-rear direction of the vehicle seat so as to arrange the wheelchair in front of the seat back, the wheelchair and the auxiliary member do not interfere with each other because the auxiliary member is not present on the trajectory of the wheelchair.

An auxiliary member attachment structure of at least one aspect of the present disclosure is the auxiliary member attachment structure of the preceding aspect, in which the auxiliary member is rotatable from the reference position to the holding position about the shaft in a case in which the restriction of rotation of the auxiliary member by the rotation restriction unit is ceased, and a support part configured to support the auxiliary member at the holding position.

In the auxiliary member attachment structure of the present aspect, the auxiliary member is rotatable from the reference position to the holding position about the shaft in a case in which the restriction of rotation of the auxiliary member by the rotation restriction unit is ceased. For this reason, the vehicle seat is provided with a support part, which is configured to support the auxiliary member at the holding position.

Here, "support" includes, relative to the auxiliary member, a case in which rotation either way in the seat vertical direction at the holding position is restricted, in addition to a case in which only downward rotation in the seat vertical direction at the holding position is restricted.

An auxiliary member attachment structure of at least one aspect of the present disclosure is the auxiliary member attachment structure of one of the aforementioned aspects, further includes a resistance force imparting member configured to impart a resistance force to the auxiliary member in a case in which the auxiliary member is rotated.

In the auxiliary member attachment structure of the present aspect, the auxiliary member includes a resistance force imparting member, which is configured to impart a resistance force to the auxiliary member in a case in which the auxiliary member is rotated. That is, in order to rotate the auxiliary member, a force larger than the resistance force imparted by the resistance imparting member is required.

Therefore, in the present aspect, even if the restriction of rotation of the auxiliary member by the rotation restriction unit at the reference position is ceased, in a state in which a force greater than the resistance force imparted by the resistance imparting member does not act on the auxiliary member, the auxiliary member is maintained at the reference position. This makes preventing the auxiliary member from rotating due to the weight of the auxiliary member or the like possible.

Here, the "resistance force" is obtained, for example, by a spring force, a frictional force, or the like.

An auxiliary member attachment structure of at least one aspect of the present disclosure is the auxiliary member attachment structure of any one of the aforementioned aspects, in which the rotation restriction unit includes: an abutment member at a lower side, in the seat vertical direction, than the shaft of the auxiliary member in a case in which the auxiliary member is at the reference position; and a first stopper that abuts the abutment member in a case in which the seat cushion is at the seating position, the first stopper includes a restriction part configured to restrict rotation, to the holding position, of the auxiliary member disposed in the reference position.

In the auxiliary member attachment structure of the present aspect, the rotation restriction unit includes an abutment member and a first stopper. The abutment member is provided at a lower side in the seat vertical direction than the shaft of the auxiliary member in a case in which the auxiliary member is at the reference position. Further, the first stopper includes a restriction part, which contacts the abutment member in a case in which the seat cushion is at the seating position and restricts rotation, to the holding position, of the auxiliary member disposed in the reference position.

More specifically, for example, in a case in which the auxiliary member disposed at the reference position is rotated toward the holding position, an upper side of the auxiliary member above the shaft in the seat vertical direction rotates toward a front side in the seat front-rear direction about the shaft. At this time, since the abutment member is provided below the shaft of the auxiliary member, in the seat vertical direction, the abutment member rotates toward a rear side in the seat front-rear direction.

Therefore, the restriction part of the first stopper abuts the abutment member and restricts the rotation of the abutment member toward the rear side in the seat front-rear direction, whereby rotation to the holding position of the auxiliary member disposed at the reference position is restricted. That is, in the present embodiment, a state in which the auxiliary member is disposed at the reference position is maintained when the seat cushion is at the seating position.

An auxiliary member attachment structure of at least one aspect of the present disclosure is the auxiliary member attachment structure of the preceding aspect, in which the rotation restriction unit further includes: a bracket that is fixed to the shaft of the auxiliary member and that supports the abutment member movably along a longitudinal direction of the auxiliary member; and a cam part that is formed at the first stopper, in which, in a case in which the auxiliary member is rotated from the holding position to the reference position when the seat cushion is at the seating position, the cam part is abutted by the abutment member, guides the abutment member toward the restriction part, and permits rotation of the auxiliary member to the reference position.

In the auxiliary member attachment structure of the present aspect, the rotation restriction unit includes a bracket and a cam part. The bracket is fixed to the shaft of the auxiliary member, and supports the abutment member movably along the longitudinal direction of the auxiliary member.

Further, the cam part is formed at the first stopper, and the cam part is abutted by the abutment member in a case in which the auxiliary member is rotated from the holding position to the reference position when the seat cushion is at the seating position. In addition, the cam part guides the abutment member toward the restriction part, and permits rotation of the auxiliary member to the reference position.

For example, a case is considered in which the auxiliary member is rotated to the reference position after the seat cushion has been set at the seating position from the storage position in a state in which the auxiliary member is disposed at the holding position. In a case in which the present aspect is not applied, when the auxiliary member is rotated toward the reference position, the abutment member interferes with the first stopper, and the rotation of the auxiliary member to the reference position is restricted.

On the other hand, in the present aspect, since the cam part is provided at the first stopper, even if the abutment member abuts the first stopper, the cam part moves the abutment member toward the restriction part, and causes the abutment member to move over the cam part, whereby the restriction of rotation of the auxiliary member toward the reference position due to the contact between the abutment member and the first stopper can be ceased.

That is, in the present aspect, rotating the auxiliary member to the reference position after the seat cushion has been placed at the seating position from a state in which the seat cushion is at the storage position and the auxiliary member is disposed at the holding position is possible.

An auxiliary member attachment structure of at least one aspect of the present disclosure is the auxiliary member attachment structure of any of the aforementioned aspects, in which the rotation restriction unit includes: an abutment member at a lower side, in the seat vertical direction, than the shaft of the auxiliary member in a case in which the auxiliary member is at the reference position; a bracket fixed to the shaft of the auxiliary member and the bracket supports the abutment member movably along a longitudinal direction of the auxiliary member; and a second stopper that, in a case in which the seat cushion at the seating position is flipped upward to the storage position, engages with the abutment member and causes the auxiliary member, via the abutment member, to rotate about the shaft from the reference position toward a front side, in the seat front-rear direction, and the second stopper supports the auxiliary member at the holding position in a case in which the seat cushion has been flipped up at the storage position.

In the auxiliary member attachment structure of the present aspect, the rotation restriction unit includes an abutment member, a bracket, and a second stopper. The abutment member is at a lower side, in the seat vertical direction, than the shaft of the auxiliary member when the auxiliary member is at the reference position. Further, the bracket is fixed to the shaft of the auxiliary member, and supports the abutment member movably along the longitudinal direction of the auxiliary member. The second stopper that, in a case in which the seat cushion at the seating position is flipped upward to the storage position, engages with the abutment member and the second stopper causes the auxiliary member, via the abutment member, to rotate about the shaft from the reference position toward the front side, in the seat front-rear direction, and supports the auxiliary member at the holding position when the seat cushion has been flipped up at the storage position.

That is, in the present aspect, in a case in which the seat cushion at the seating position is flipped upward, the auxiliary member rotates from the reference position toward the front, in the seat front-rear direction, by the second stopper and the abutment member, and at the storage position in which the seat cushion is flipped up, the auxiliary member is supported at the holding position.

An auxiliary member attachment structure of at least one aspect of the present disclosure is the auxiliary member attachment structure of any of the aforementioned aspects, in which the auxiliary member includes a handrail member configured to be gripped by a wheelchair occupant seated in a wheelchair that is immobilized at a position closer to a front side, in the seat front-rear direction, than the seat cushion when the seat cushion is at the storage position.

Here, the seat cushion can be stored, and at the storage position of the seat cushion, the seat cushion can be flipped up so as to align with the seat back. In this way, at the storage position of the seat cushion, since the space at the front side, in the seat front-rear direction, of the seat back is not occupied, the wheelchair can be disposed using this space.

In the auxiliary member attachment structure of the present aspect, the auxiliary member includes a handrail member for a wheelchair, and in the storage position of the seat cushion, restriction of rotation of the handrail member standing upright along the seat vertical direction is ceased.

That is, the handrail member can rotate from the reference position closer to the front side, in the seat front-rear direction. A wheelchair occupant seated in a wheelchair that is immobilized at the front side, in the seat front-rear direction, with respect to the seat cushion, can grip the handrail member.

An auxiliary member attachment structure of at least one aspect of the present disclosure is the auxiliary member attachment structure of any of the aforementioned aspects, in which the auxiliary member includes a table member closer to a front side, in the seat front-rear direction, than the seat cushion when the seat cushion is at the storage position.

In the auxiliary member attachment structure of the other aspect, the auxiliary member includes a table member that is disposed closer to the front side, in the seat front-rear direction, than the seat cushion at the storage position. As a result, for example, a passenger in the vehicle cabin can use the table member as a luggage rack, or a wheelchair occupant seated in a wheelchair can use the table member.

A vehicle seat according to at least one aspect of the present disclosure includes: an auxiliary member, a seat back, and a seat cushion configured to be flipped upward so as to be aligned with the seat back; in which the auxiliary member includes the auxiliary member attachment structure of any of the aforementioned aspects.

In the vehicle seat of the present aspect, a vehicle seat, an auxiliary member, and a rotation restriction unit are included, and the vehicle seat is configured so that the seat cushion can be flipped upward to align with the seat back.

Further, the auxiliary member is provided at the outer side in the seat width direction of the vehicle seat, and is rotatable about the shaft provided in the seat extending along the seat width direction, and rotation of the auxiliary member is restricted, and the restriction of rotation of the auxiliary member is ceased. Further, the rotation restriction unit is provided at the seat, restricts the rotation of the auxiliary member at the reference position when the seat cushion is at the seating position, and ceases the restriction of rotation of the auxiliary member when the seat cushion is flipped upward.

The "vehicle" here includes a bus, a train, and the like in addition to an automobile.

As described above, the auxiliary member attachment structure of the at least one aspect has an excellent effect whereby interference between the auxiliary member and a wheelchair can be avoided or reduced when a wheelchair is moved or turned back in a vehicle cabin.

The auxiliary member attachment structure of the at least one aspect has an excellent effect whereby the auxiliary member can be supported at the holding position, which is different from the reference position, by the support part provided at the vehicle seat.

The auxiliary member attachment structure of the at least one aspect has an excellent effect whereby even if restriction of rotation of the auxiliary member at the reference position is ceased, the auxiliary member can be prevented from arbitrarily rotating by due to the weight of the auxiliary member or the like.

The auxiliary member attachment structure of the at least one aspect has an excellent effect whereby, when the seat cushion is at the seating position, by maintaining a state in which the auxiliary member is disposed at the reference position, an occupant standing up in the vehicle cabin can grip the auxiliary member.

The auxiliary member attachment structure of the at least one aspect has an excellent effect whereby, in a state in which the seat cushion is at the storage position and the auxiliary member is disposed at the holding position, the auxiliary member may be rotated to the reference position after the seat cushion is put at the seating position, or the auxiliary member may be rotated to the reference position before the seat cushion is put at the seating position.

The auxiliary member attachment structure of the at least one aspect has an excellent effect whereby, in the case of flipping up the seat cushion from the seating position, the auxiliary member is rotated from the reference position toward the front side in the seat front-rear direction, and the auxiliary member can be supported at the holding position when the seat cushion is at the storage position.

The auxiliary member attachment structure of the at least one aspect has an excellent effect whereby a wheelchair occupant seated on a wheelchair can grip the handrail member.

The auxiliary member attachment structure of the at least one aspect has an excellent effect whereby, by disposing a table member at a front side in the seat front-rear direction relative to the seat cushion, not only can an occupant in the vehicle cabin use the table member as a luggage rack, but also a wheelchair occupant seated on a wheelchair can use the table member.

The vehicle seat of the at least one aspect has an excellent effect whereby, when the wheelchair is moved or turned back in the vehicle cabin, interference between the auxiliary member and the wheelchair can be avoided or reduced.

BRIEF DESCRIPTION OF THE DRAWINGS

Preferred embodiments will be described in detail based on the following figures, wherein:

FIG. 1A is a front view of a vehicle seat with an auxiliary member according to at least one embodiment;

FIG. 1B is a side view of the vehicle seat with the auxiliary member according to at least one embodiment;

FIG. 3A is a perspective view of a rotation restricting unit that is a part of the attachment structure of the auxiliary member according to at least one embodiment;

FIG. 3B is a perspective view of the rotation restricting unit that is a part of the attachment structure of the auxiliary member according to at least one embodiment;

FIG. 4A is a side view of the vehicle seat showing the seating position of the seat cushion for a vehicle seat with the auxiliary member according to at least one embodiment and the reference position of the handrail member;

FIG. 4B is a side view of the rotation restricting unit in the state of FIG. 4A;

FIG. 5A is a side view of the rotation restricting unit that forms a part of the auxiliary member mounting structure according to at least one embodiment;

FIG. 5B is a side view of the rotation restricting unit that forms a part of the auxiliary member mounting structure according to at least one embodiment;

FIG. 5C is a side view of the rotation restricting unit that forms a part of the auxiliary member mounting structure according to at least one embodiment;

FIG. 6A is a side view of the vehicle seat showing the storage position of the seat cushion for a vehicle seat with the auxiliary member according to at least one embodiment and the reference position of the handrail member;

FIG. 6B is a side view of the rotation restricting unit in the state of FIG. 6A;

FIG. 8A is a side view of the vehicle seat showing the storage position of the seat cushion of the vehicle seat with the auxiliary member according to at least one embodiment and the state in which the handrail member is rotated forward in the front-rear direction of the seat;

FIG. 8B is a side view of the rotation restricting unit in the state of FIG. 8A;

FIG. 10A is a side view of the rotation restricting unit, which is a part of the attachment structure of the auxiliary member according to at least one embodiment, showing the storage position of the seat cushion and the holding position of the handrail member;

FIG. 10B is a side view of the rotation restricting unit, which is a part of the attachment structure of the auxiliary member according to at least one embodiment, showing a seat cushion seating position and a handrail member holding position;

FIG. 11A is a side view of the rotation restricting unit, which is a part of the attachment structure of the auxiliary member according to the first embodiment, showing a seat cushion seating position and a state in which the handrail member is in the middle of being rotated to the reference position;

FIG. 11B is a side view of the rotation restricting unit, which is a part of the attachment structure of the auxiliary member according to the first embodiment, showing a seat cushion seating position and a handrail member reference position;

FIG. 12A is a side view of the vehicle seat showing the seating position of the seat cushion for a vehicle seat with the auxiliary member according to at least one embodiment and a reference position of a table member;

FIG. 12B is a side view of the vehicle seat showing the storage position of the seat cushion for a vehicle seat with the auxiliary member according to at least one embodiment and the holding position of the table member;

FIG. 13A is a side view of the vehicle seat showing the seating position of the seat cushion for a vehicle seat with the auxiliary member according to at least one embodiment and the reference position of the table member;

FIG. 13B is a side view of the rotation restricting unit in the state of FIG. 13A;

FIG. 14A is a side view of the rotation restricting unit showing the seating position of the seat cushion for a vehicle seat with the auxiliary member according to at least one embodiment and the reference position of the table member;

FIG. 14B is a side view of the rotation restricting unit showing a state in which the seat cushion of the vehicle seat with the auxiliary member according to at least one embodiment tilts up from a seating position;

DETAILED DESCRIPTION

Figure 2:
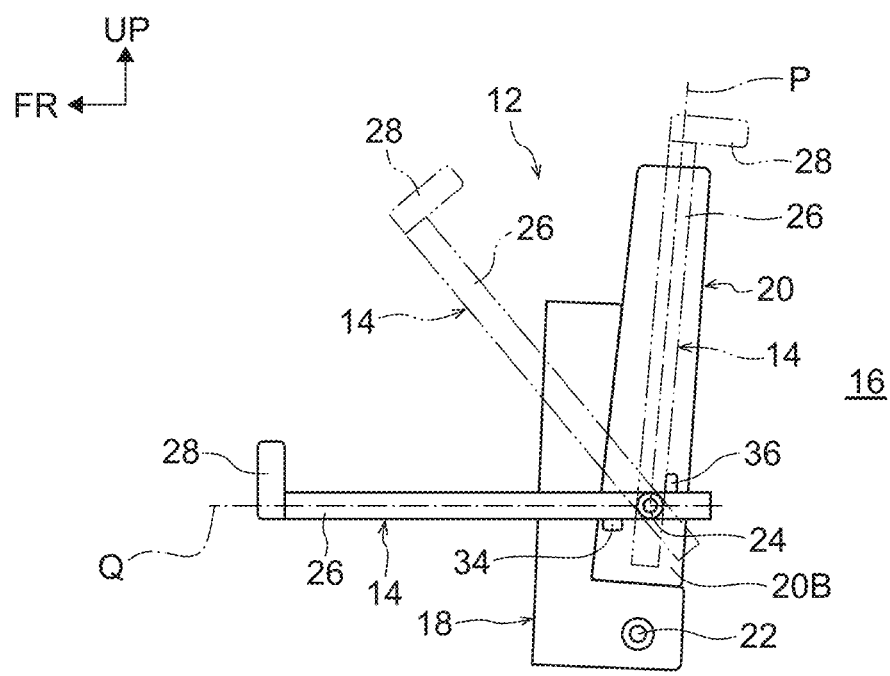
FIG. 2 is a side view of the vehicle seat showing a rotation operation of a handrail member as an auxiliary member according to at least one embodiment.

Hereinafter, a vehicle seat including a handrail member, to which an auxiliary member mounting structure according to a first embodiment of the present invention is applied, will be described with reference to the drawings. Note that an arrow UP appropriately shown in each drawing indicates an upper side in the seat vertical direction, an arrow FR indicates a front side in the seat front-rear direction, and an arrow RH indicates a right side in the seat width direction. Furthermore, when the directions of front/rear, upper/lower, and right/left are used without further specification in the following description, these will be understood to mean front/rear in the seat front and rear direction, upper/lower in the seat up and down direction, and right/left when facing the direction of forward travel.

First Exemplary Embodiment (Configuration of Handrail Member)

First, referring to FIGS. 1 to 11B, the configuration of the handrail member 14 according to the first embodiment of the present invention, that is, a seat body 12 of a vehicle seat to which an auxiliary member mounting structure 10 is attached, and an auxiliary member provided thereon, will be described.

FIG. 1A shows a front view of a vehicle seat 12 including a handrail member 14 as an auxiliary member according to the first embodiment, and FIG. 1B shows a side view of the vehicle seat 12. As shown in FIGS. 1A and 1B, the vehicle seat 12 includes a seat cushion 18 on which an occupant in a vehicle cabin 16 can be seated, and a seat back 20 for supporting the back of the seated occupant.

At the rear end 18A of the seat cushion 18 of the vehicle seat 12 in the front-rear direction (arrow L direction), a shaft portion 22 is extends in the seat width direction (arrow W direction), and the seat cushion 18 is rotatable about the shaft portion 22.

Although not shown, the seat cushion 18 of the vehicle seat 12 includes a lock member for maintaining the seat cushion 18 in a seating position in which an occupant can be seated (seated state). For example, by pressing a button or the like, the locked state of the lock member is able to be released, and when the locked state is released, the seat cushion 18 of the vehicle seat 12 can spring upward so as to align with the seat back 20. The state in which the seat cushion 18 is flipped up, as shown in FIG. 6A, is hereinafter referred to as the storage position (storage state) of the seat cushion 18.

As shown in FIGS. 1A and 1B, a handrail member 14 is on an outer side portion 20A of the vehicle seat 12 in the seat width direction so as to stand upright in the seat vertical direction. The handrail member 14 includes a shaft portion 24 extending in the seat width direction at a lower end portion 20B of the seat back 20 of the vehicle seat 12, and the handrail member 14 is rotatable about the shaft portion 24. Note that the reference position P is a position at which the handrail member 14 stands up along the seat vertical direction. The state where the handrail member 14 is arranged at the reference position P is referred to as the reference state of the handrail member 14.

The handrail member 14 is formed of, for example, a metal pipe. The handrail member 14 includes grip portion 26 extending along the seat vertical direction in the reference position P, and grip portion 28 at the free end 14A of the handrail member 14 and bent toward the rear in the seat front-rear direction relative to the grip portion 26.

The grip portion 28 is set, at reference position P of the handrail member 14, so as to have a length protruding beyond the back surface 20D of the seat back 20 above the upper end 20C of the seat back 20 of the vehicle seat 12, and while not shown, an occupant standing in the vehicle interior 16 can grip the grip portion 28.

Figure 9A:
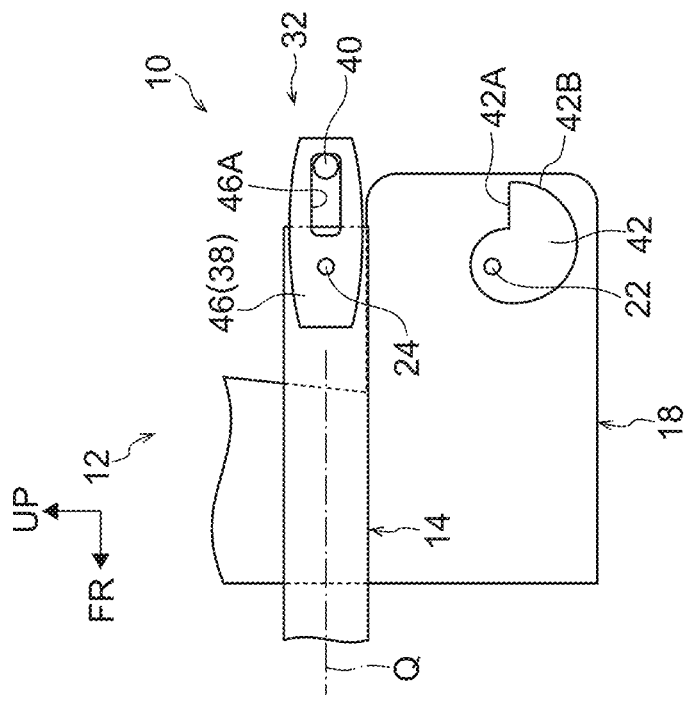
FIG. 9A is a side view of the vehicle seat showing the storage position of the seat cushion for a vehicle seat with the auxiliary member according to at least one embodiment and the holding position of the handrail member.

While discussed below, as shown in FIG. 9A, the gripping portions 26 and 28 can be gripped as a handrail by a wheelchair occupant sitting on the wheelchair 30. FIG. 9A is a side view showing the stored state of the seat cushion 18 of the vehicle seat 12 and the reference position P of the handrail member 14.

Here, as shown in FIG. 1A, in the present embodiment includes a rotation restricting unit 32, which includes the shaft portion 24 of the handrail member 14 on the seat back 20, and the shaft portion 22 of the seat cushion 18. In FIG. 1B, illustration of the rotation restricting unit 32 is omitted, and in the following description, in FIGS. 2, 4A, 6A, 7, 8A, and 9A, showing side views of the vehicle seat 12, illustration of the rotation restricting unit 32 is omitted as in FIG. 1B.

Further, FIGS. 5A to 5C are side views of the rotation restricting unit 32 showing the reference position P of the handrail member 14, respectively. FIG. 5A shows the seating position of the seat cushion 18, FIG. 5B shows a state where the seat cushion 18 flips up from the seating position, and FIG. 5C shows a side view showing the storage position of the seat cushion 18.

As shown in FIG. 5A, the rotation restricting unit 32 regulates forward rotation of the handrail member 14 in the seat front-rear direction at the reference position P of the handrail member 14 in the seating position of the seat cushion 18; that is, the rotation of the handrail member 14 is restricted. Further, the rotation restricting unit 32 is configured such that, as shown in FIGS. 5B and 5C, when the seat cushion 18 is flipped up from the seating position, the restriction of the rotation of the handrail member 14 ceases.

FIG. 2 is a side view of the vehicle seat 12 showing the rotation operation of the handrail member 14. As shown in FIGS. 1A and 2, a support portion 34 is provided on the outer portion 20A of the vehicle seat 12 in the vicinity of the shaft portion 24 of the handrail member 14 in the seat back 20 and on the front side of the shaft portion 24. A contact portion 36 is provided on the rear side of the shaft portion 24.

The contact portion 36 is disposed on the rear side of the handrail member 14 at the reference position P of the handrail member 14 shown by a two-dot chain line, and comes into contact with the handrail member 14 so as to regulate rotation of the handrail member 14 about the shaft portion 24 toward the rear.

Further, the support portion 34 is below the handrail member 14 at a predetermined holding position Q (here, a substantially horizontal position) of the handrail member 14 shown by a solid line, and the support portion 34 regulates a maximum downward rotation of the handrail member 14 about the shaft portion 24. The state where the handrail member 14 is arranged at the holding position Q is referred to as the holding state of the handrail member 14.

(Rotation Restriction Unit)

Hereinafter, the rotation restricting unit 32 will be described.

Figure 9B:
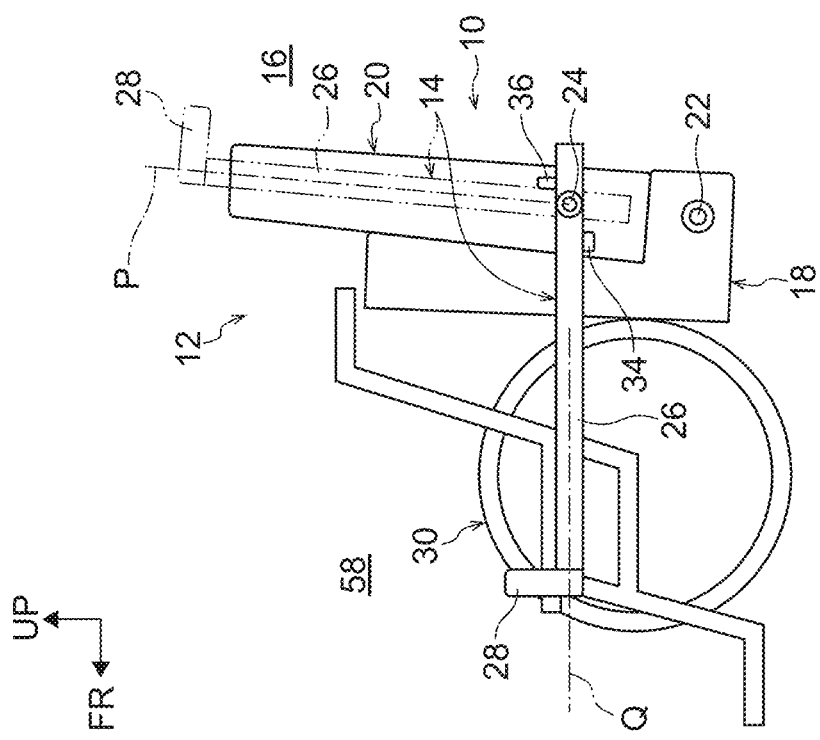
FIG. 9B is a side view of the rotation restricting unit in the state of FIG. 9A.

FIG. 3A shows the rotation restricting unit 32 in a state where the handrail member 14 is arranged at the reference position P, and FIG. 3B shows the rotation restriction unit 32 in a state where the handrail member 14 is arranged at the holding position Q. Further, FIG. 4B shows a side view of the rotation restricting unit 32 corresponding to FIG. 3A, and FIG. 9B shows a side view of the rotation restricting unit 32 corresponding to FIG. 3B.

FIG. 4A is a side view of the vehicle seat 12 showing the seating position of the seat cushion 18 and a state where the handrail member 14 is arranged at the reference position P. FIG. 9A is a side view of the vehicle seat 12 showing the storage position of the seat cushion 18 and a state where the handrail member 14 is disposed at the holding position Q.

As shown in FIGS. 3A and 3B, the rotation restricting unit 32 includes, for example, a metal bracket 38 on at least the seatback 20 (see FIG. 2) side, a cylindrical pin 40, as a contact member, that is engaged with the bracket 38 provided on the seatback 20 side, and a metal stopper (first stopper) 42 provided on the side of the seat cushion 18 (see FIG. 2) and capable of contacting the pin 40. In the present embodiment, the cylindrical pin 40 is taken as an example of the contact member, but the present invention is not limited to this, as long as the contact member can contact the stopper 42.

At the side of the seatback 20 (see FIG. 2), a pair of plates 44 and 46 configuring the bracket 38 are fixed to the shaft portion 24 of the handrail member 14 provided at the lower end portion 20B (see FIG. 2) of the seatback 20, with the handrail member 14 disposed therebetween.

A wave washer 54 is between the plate 44 and the handrail member 14, and a wave washer 56 is between the plate 46 and the handrail member 14. When the handrail member 14 rotates about the shaft portion 24, sliding resistance acts on the handrail member 14 due to these wave washers 54 and 56.

Further, as shown in FIG. 3A, the plates 44, 46 are arranged along the seat vertical direction at the reference position P of the handrail member 14, and the upper side of the plates 44, 46 is fixed to the shaft portion 24 of the handrail member 14. Substantially rectangular slits 44A and 46A are formed below the plates 44 and 46 along the longitudinal direction of the plates 44 and 46, respectively.

One end 40A in the longitudinal direction of the cylindrical pin 40 as a contact member is inserted into the slit 44A, and the other end 40B in the longitudinal direction of the pin 40 is inserted into the slit 46A. The pin 40 is movable in the slits 44A and 46A. The slits 44A and 46A are configured such that the pin 40 does not interfere with the handrail member 14 when the pin 40 moves in the slits 44A and 46A. Further, the pin 40 may be configured so as to be biased toward the lower end 47 of the slits 44A, 46A by a spring member (not shown).

A stopper 42 is fixed to the shaft 22 of the seat cushion 18, at the side of the seat cushion 18 (see FIG. 2). As shown in FIG. 3B, the stopper 42 has a substantial disk shape, and has a notch 48 formed by cutting the upper side and the rear side of the stopper 42 at the holding position Q of the handrail member 14. As shown in FIG. 3A, the notch 48 is formed by cutting out the upper side and the front side of the stopper 42 at the reference position P of the handrail member 14.

As shown in FIG. 3B, due to the notch 48 being formed, the stopper 42, at the holding position Q of the handrail member 14, includes a semicircular portion 50 provided at the lower side of the stopper 42, and a semicircular portion 52 provided on the upper side and the front side of the stopper 42 and having a radius dimension of about half the radius of the semicircular portion 50. Note that the shaft portion 22 is fixed to the semicircular portion 52.

A contact surface 42A is provided on the semicircular portion 50 side of the notch portion 48 as a regulating portion. As shown in FIGS. 4A and 4B, at the seating position of the seat cushion 18 and the reference position P of the handrail member 14, the contact surface 42A is located rearward of the pin 40 and is in contact with the pin 40, and regulates (that is, restricts) forward rotation of the handrail member 14.

The outer peripheral surface of the semicircular portion 50 is a cam surface 42B. The cam surface 42B can push the pin 40 upward along the shape of the cam surface 42B in a state where the pin 40 is in contact with the cam surface 42B.

The stopper 42 rotates about the shaft portion 22 via the shaft portion 22 of the seat cushion 18 from the seating position of the seat cushion 18 shown in FIG. 5A to the storage position of the seat cushion 18 shown in FIG. 5C.

Therefore, when the seat cushion 18 is flipped up, the stopper 42 is configured such that the contact surface 42A of the stopper 42 is separated from the pin 40 and is released from a state of contact with the pin 40, as shown in FIGS. 5B and 5C. Thereby, the handrail member 14 can rotate forward.

In this state, when the handrail member 14 is rotated with a force larger than the resistance force of the wave washers 54 and 56 shown in FIGS. 3A and 3B, the handrail member 14 can be turned forward in the front-rear direction from the reference position P as shown in FIG. 2.

Then, as shown by the solid line in FIG. 2, when the handrail member 14 reaches the holding position Q, the handrail member 14 comes into contact with the support portion 34, and the downward rotation about the shaft portion 24 is stopped. That is, the handrail member 14 is supported by the support portion 34 at the holding position Q.

(Action and Effect of Handrail Member)

Next, the action and effect of the handrail member 14 to which the auxiliary member mounting structure according to the first embodiment is applied will be described.

As shown in FIGS. 1A and 1B, in the present embodiment, a handrail member 14 and a rotation restricting unit 32 are provided on the vehicle seat 12, and the handrail member 14 is provided on the outer side 20A of the vehicle seat 12. Further, the handrail member 14 is rotatable about a shaft portion 24 provided along the seat width direction in the vehicle seat 12, and an upright position along the seat up-down direction is a reference position P.

As shown in FIGS. 4A and 4B, the rotation restricting unit 32 is configured so as to restrict the rotation of the handrail member 14 at the reference position P in the seating position of the seat cushion 18.

Further, as shown in FIGS. 6A and 6B, the rotation restricting unit 32 is configured such that the rotation restriction of the handrail member 14 is ceased when the seat cushion 18 is not in the seating position. Thus, when the rotation restriction of the handrail member 14 is ceased, the handrail member 14 is rotatable about the shaft portion 24.

Figure 7:
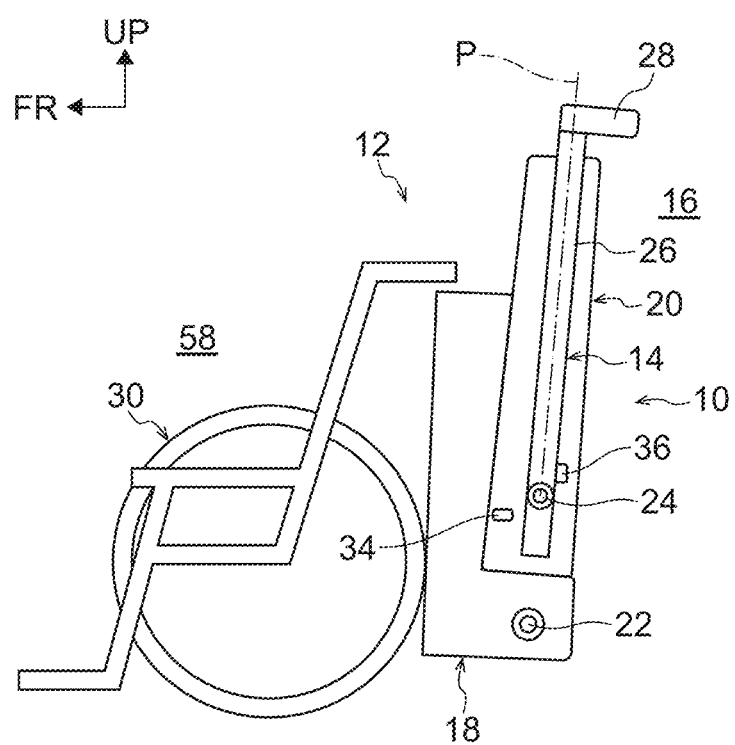
FIG. 7 is a side view of the vehicle seat showing a state in which a wheelchair is arranged in front of the seat cushion in the storage position of the seat cushion of the vehicle seat with the auxiliary member according to at least one embodiment.

As shown in FIG. 6A, in the storage position of the seat cushion 18, a size of the space 58 at the front side of the seat cushion 18 is increased by a difference in the amount of space occupied when the seat cushion is in the seating position in comparison to when the seat cushion 18 is flipped up. Therefore, the wheelchair 30 can be arranged within the space 58 as shown in FIG. 7.

That is, when the wheelchair 30 is arranged in the space 58, since the seat cushion 18 is in a flipped up and stored state, the seat cushion 18 is not an obstacle and the wheelchair 30 can be easily arranged.

In this embodiment, as shown in FIGS. 6A and 6B, when the seat cushion 18 is stored, the rotation restriction of the handrail member 14 is ceased.

For this reason, as shown in FIGS. 8A and 8B, in a state where the wheelchair 30 is arranged in front of the seat back 20, the handrail member 14 can be rotated from the reference position P toward the front in the seat front-rear direction.

As shown in FIGS. 9A and 9B, owing to the handrail member 14 being supported at the holding position Q, the wheelchair occupant sitting on the wheelchair 30 can grasp the grips 26 and 28 of the handrail member 14 as handrails, respectively.

By the way, in the present embodiment, as shown in FIGS. 1A and 1B, the handrail member 14 is on the outer portion 20A of the vehicle seat 12 in an upright state along the vertical direction of the seat.

Therefore, as shown in FIG. 9, even when the wheelchair 30 is moved along the front-back direction of the seat when the wheelchair 30 is arranged in front of the seatback 20, the handrail member 14 is not present along the movement track of the wheelchair 30. For this reason, the wheelchair 30 and the handrail member 14 do not interfere with each other when the wheelchair 30 moves along the seat front-rear direction.

That is, in the present embodiment, when the wheelchair 30 is moved or turned back in the vehicle interior 16, interference between the handrail member 14 and the wheelchair 30 can be avoided or reduced.

Further, in the present embodiment, as shown in FIG. 6B, when the seat cushion 18 is stored, and the rotation restriction by the rotation restricting unit 32 (that is, the state of contact between the contact surface 42A and the pin 40 shown in FIG. 4B) is ceased, as shown in FIG. 2, the handrail member 14 is rotatable about the shaft portion 24 from the reference position P toward the front side as shown in FIG. 2. Since the support portion 34 is provided on the vehicle seat 12, when the handrail member 14 contacts the support portion 34, the handrail member 14 is supported at the holding position Q.

In the present embodiment, the support portion 34 is disposed below the handrail member 14 at the holding position Q, and prevents the handrail member 14 from rotating downward about the shaft portion 24, but the support portion 34 is not limited to this. For example, in this state, the handrail member 14 may be locked by a lock device (not shown), so that not only the downward movement of the handrail member 14 but also the upward movement thereof may be regulated.

Further, in the present embodiment, the support portion 34 is configured such that the handrail 14 is supported at the holding position Q where the handrail member 14 is arranged substantially horizontally, but the position of the support portion 34 is not limited to this. For example, although not shown, a plurality of holes may be provided on the outer portion 20A of the vehicle seat 12 (see FIG. 1A) concentrically with the shaft portion 24 of the handrail member 14, and the support member may be fitted into and fixed to the holes, and the holding position of the handrail member 14 may be freely set by supporting the handrail member 14 with this support member.

Further, in this embodiment, the handrail member 14 is provided with wave washers 54 and 56 (see FIGS. 3A and 3B), and when the handrail member 14 rotates, a resistance force is applied to the handrail member 14. That is, in order to rotate the handrail member 14, a force larger than the resistance force of the wave washers 54 and 56 is required.

Therefore, in the present embodiment, even when the rotation restriction of the handrail member 14 by the rotation restriction unit 32 is ceased at the reference position P, in a state in which a load larger than the resistance force of the wave washers 54 and 56 is not applied to the handrail member 14, the handrail member 14 is maintained at the reference position P. Thereby, even if the rotation restriction of the handrail member 14 is ceased at the reference position P, the handrail member 14 can be prevented from rotating as a result of the weight of the handrail member 14 or the like.

Here, the wave washers 54 and 56 are used as the "resistance applying member", but the member that applies the resistance to the handrail member 14 is not limited to this. For example, although not shown, a resistance force may be applied to the handrail member 14 by a spring force of a spring.

Further, as described above, in the present embodiment, as shown in FIGS. 2, 4A, and 4B, the rotation restricting unit 32 is configured to include the pin 40 and the stopper 42. The pin 40 is provided below the shaft portion 24 of the handrail member 14 in the seat vertical direction at the reference position P of the handrail member 14, and the contact surface 42A contacts the pin 40 in the seating position of the seat cushion 18, and restricts movement to the holding position Q of the handrail member 14 disposed at the reference position P.

In the present embodiment, for example, when the handrail member 14 arranged at the reference position P is turned to the predetermined holding position Q side, the handrail member 14 turns about the shaft portion 24 toward the front side. At this time, the pin 40 rotates rearward. For this reason, the contact surface 42A abuts on the pin 40 and regulates the movement of the pin 40 toward the rear side, whereby the movement of the handrail member 14 arranged at the reference position P toward the holding position Q is regulated.

That is, in the present embodiment, in the seating position of the seat cushion 18, the handrail member 14 cannot be rotated forward. In the state where the handrail member 14 is located at the reference position P, the contact portion 36 contacts the handrail member 14 to restrict the handrail member 14 from rotating rearward.

Therefore, at the seating position of the seat cushion 18, the state in which the handrail member 14 is disposed at the reference position P is maintained, and the occupant standing in the vehicle interior 16 can grip the handrail member 14.

In the present embodiment, the rotation restricting unit 32 includes a bracket 38 and a cam surface 42B. The plate 46 configuring the bracket 38 is formed in a long plate shape, a slit 46A is formed in the plate 46 along the longitudinal direction, and the pin 40 is movably accommodated in the slit 46A.

The cam surface 42B is formed on a stopper 42 provided with an abutment surface 42A, and is contacted by the pin 40 when the handrail member 14 rotates from the holding position Q to the reference position P in the seating position of the seat cushion 18. Further, the cam surface 42B guides the pin 40 to the shaft portion 24 side of the handrail member 14 in the slits 44A and 46A formed in the bracket 38, and allows the handrail member 14 to rotate to the reference position P.

For example, a case is considered in which, from the storage position of the seat cushion 18 and the state in which the handrail member 14 is disposed at the holding position Q as shown in FIG. 10A, the handrail member 14 is turned to the reference position P after the seat cushion 18 is placed in the seating position as shown in FIG. 10B.

In a variation of the present embodiment, although not shown, when the handrail member 14 is to be rotated to the reference position P side, the pin 40 may interfere with the stopper 42 and rotation of the handrail member 14 toward the reference position P side may be restricted.

On the other hand, in the present embodiment, since the cam surface 42B is provided on the stopper 42, even if the pin 40 comes into contact with the stopper 42, the pin 40 can be moved to the shaft portion 24 side by the cam surface 42B and caused to move within slit 46A to pass over the cam surface 42B as shown in FIG. 11A. Thereby, as shown in FIG. 11B, ceasing of the regulation of the handrail member 14 from rotating toward the reference position P is possible due to the contact between the pin 40 and the stopper 42.

That is, in the present embodiment, after the seat cushion 18 has been placed in the seating position as shown in FIG. 10B from the storage position of the seat cushion 18 and a state in which the handrail member 14 is disposed at the holding position Q as shown in FIG. 10A, the handrail member 14 can be rotated to the reference position P as shown in FIGS. 11A and 11B.

Therefore, as described above, in the storage position of the seat cushion 18 and the state where the handrail member 14 is disposed at the holding position Q, the handrail member 14 may be rotated to the reference position P after the seat cushion 18 is set to the seating position, and, as shown in FIG. 6B, the handrail member 14 may be rotated to the reference position P before the seat cushion 18 is set to the sitting position.

Further, in the present embodiment, as shown in FIG. 1A, the rotation restricting unit 32 is provided so as to be exposed at the vehicle interior 16 side, but may be covered by a cover (not shown).

Although not shown, a part of the rotation restricting unit 32 may be set to be in the seat cushion 18 of the vehicle seat 12. For example, one side of the stopper 42 and the pin 40 in the longitudinal direction may be the part of the rotation restricting unit 32. In this case, the other side in the longitudinal direction of the bracket 38 and the pin 40 may be arranged outside the seat cushion 18.

Second Exemplary Embodiment (Configuration of Table Member)

Next, with reference to FIGS. 12 to 16, the configuration of a table member 64 according to a second embodiment of the present invention, that is, of a vehicle seat (seat main body) 62 to which an auxiliary member mounting structure 60 is applied and the table member (auxiliary member) 64 thereon, will be described. Hereinafter, substantially the same components as those of the first embodiment are denoted by the same reference numerals, and description thereof will be omitted.

FIGS. 12A and 12B are each side views of a vehicle seat 62 to which is attached a table member 64 as an auxiliary member according to the second embodiment. FIG. 12A shows a seating position of the seat cushion 18 and a reference state (reference position P) of the table member 64, and FIG. 12B shows a storage position of the seat cushion 18 and a holding state (holding position R) of the table member 64.

In this embodiment, as shown in FIG. 12B, the table member 64 may be include, for example, a long plate-shaped table 70 at the distal end portion 28A of the grip portion 28 of the handrail member 14 indicated by a two-dot chain line. In the following description, for convenience, the names of the gripping portions 26, 28 in the first embodiment are changed to the leg portion 66 and the connecting portion 68, respectively.

As shown by the solid lines in FIGS. 12A and 12B, a shaft portion 72 is provided in the connecting portion 68 along the seat width direction, and a table 70 is attached to the shaft portion 72. Therefore, the table 70 is rotatable about the shaft 72.

The shaft portion 72 is provided with wave washers (not shown), and is set so that a resistance force is applied to the table 70 when the table 70 rotates.

Further, in the present embodiment, as shown in FIG. 12A, in the reference position P of the table member 64, that is, in the storage state of the table 70, the table 70 is arranged rearward of the seatback 20 and substantially parallel to the leg portion 66 and the seatback 20.

Further, as shown in FIG. 12B, at the holding position R of the table member 64, the table 70 is arranged so as to be substantially horizontal at the front side of the seat back 20. That is, the table 70 is in a usable state. Note that the holding position R of the table member 64 may be set freely, similarly to the handrail member 14.

(Rotation Restriction Unit)

As shown in FIGS. 13A and 13B, in the rotation restricting unit 76 in the present embodiment, a stopper (second stopper) 78 is fixed to the shaft 22 of the seat cushion 18. The stopper 78 has a substantially disk shape, and the cutout portion 80 is formed by cutting out the upper side and the rear side of the stopper 78 in the reference position P of the table member 64. The contact surface 78A of the stopper 78 is disposed forward of the pin 40 with a gap 82 provided between the contact surface 78A and the pin 40.

Therefore, as shown in FIGS. 14A and 14B, when the seat cushion 18 is to be flipped up from the seating position, the contact surface 78A of the stopper 78 contacts the pin 40 via the gap 82. As described above, the pin 40 is movable in the slit 46A formed in the bracket 38.

Therefore, when the pin 40 is arranged on the upper end 49 side of the slit 46A at the reference position P of the table member 64, the pin 40 is moved, via the contact surface 78A of the stopper 78 as the seat cushion 18 flips up, inside of the slit 46A to the lower end 47 side.

As a result, the table member 64 rotates about the shaft portion 24 via the pin 40 toward the front side in the seat front-rear direction. Note that the pin 40 is configured so as to be biased toward the upper end 49 of the slit 46A by a spring member (not shown).

In the present embodiment, as shown in FIG. 12A, the table 70 is connected to the leg 66 via the connecting portion 68, and the table 70 and the connecting portion 68 are rotatable via the shaft 72. At the reference position P of the table member 64, the table 70 is disposed behind the seat back 20 so as to be substantially parallel to the leg 66 and the seat back 20.

Figure 15B:
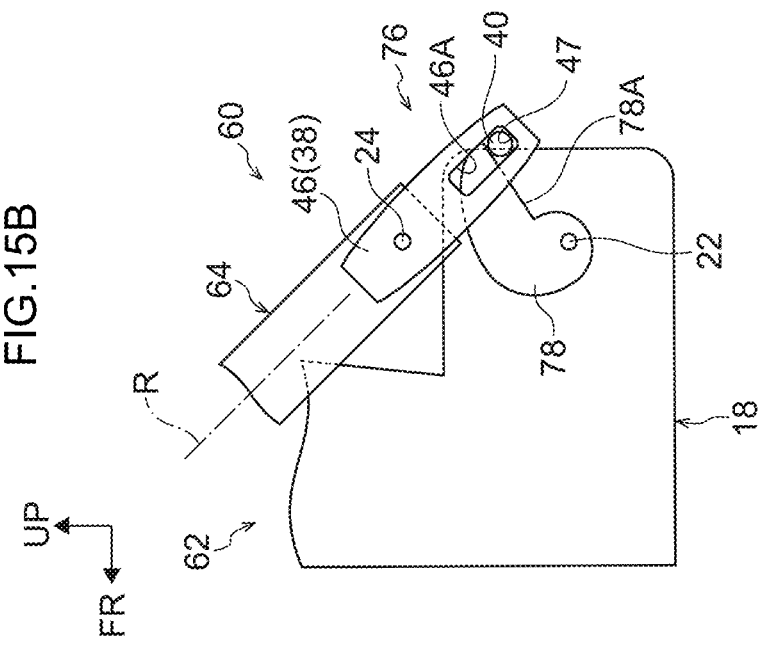
FIG. 15B is a side view of the rotation restricting unit showing the storage position of the seat cushion for a vehicle seat with the auxiliary member according to at least one embodiment and the holding position of the table member.
Figure 15A:
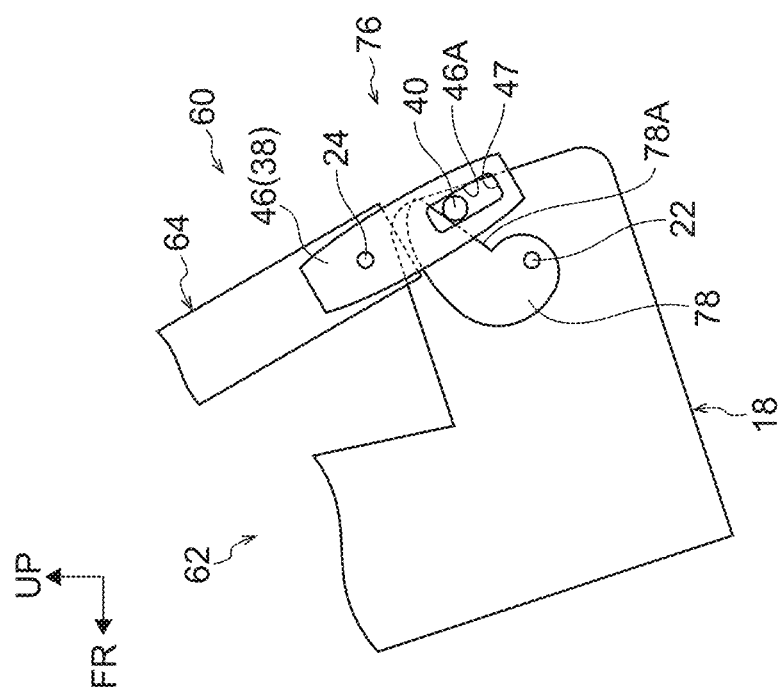
FIG. 15A is a side view of the rotation restricting unit showing a state in which the table member rotates toward the holding position while the seat cushion of the vehicle seat with the auxiliary member according to at least one embodiment rises suddenly from the sitting position.
Figure 16A:
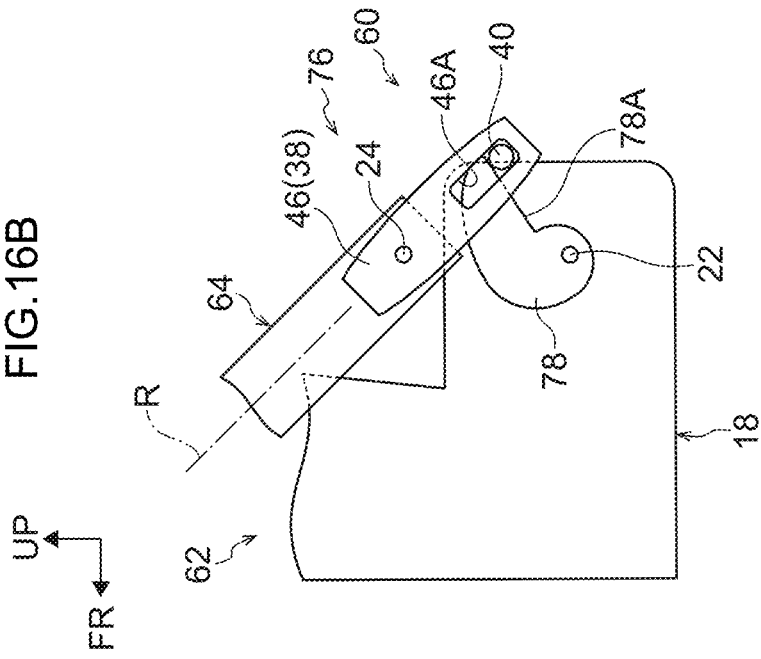
FIG. 16A is a side view of the vehicle seat showing the storage position of the seat cushion for a vehicle seat with the auxiliary member according to at least one embodiment and the holding position of the table member.
Figure 16B:
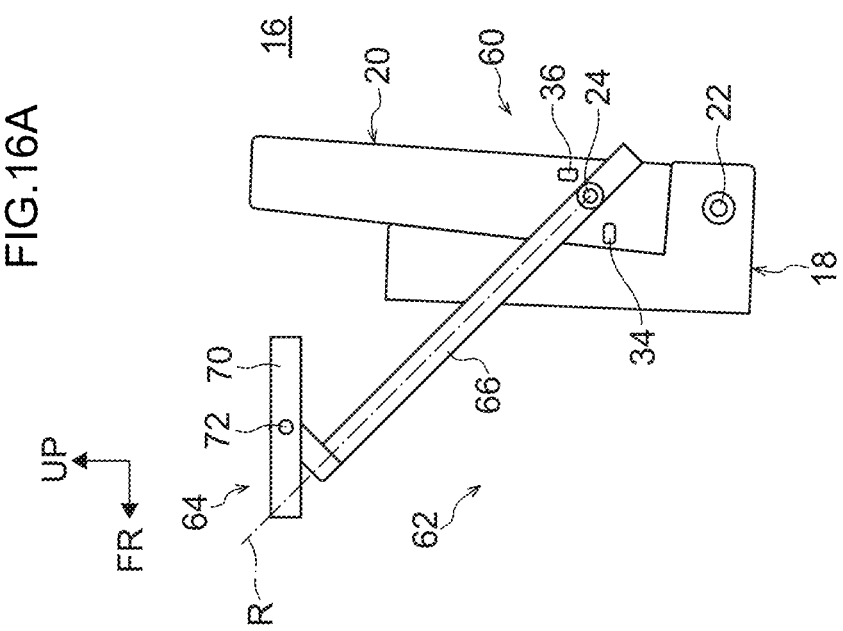
FIG. 16B is a side view showing the rotation restricting unit in the state of FIG. 16A.

As shown in FIGS. 12B, 15A, and 15B, when the table member 64 rotates forward from the reference position P, the table 70 comes into contact with the seat back 20; however, utilizing the contact with the seat back 20, the table 70 pivots (deploys) forward about the shaft portion 72 of the connecting portion 68.

Then, as shown in FIGS. 12B and 15B, when the pin 40 reaches the lower end 47 of the slit 46A, the pin 40 is clamped between the lower end 47 of the slit 46A and the contact surface 78A of the stopper 78. Thus, the table member 64 is held at the predetermined holding position R. That is, the table 70 is in a usable state.

(Operation and Effect of Table Member)

Next, the operation and effects of the table member 64 provided on the vehicle seat (seat body) 62 to which the auxiliary member mounting structure according to the second embodiment is applied, will be described.

As shown in FIGS. 12A and 12B, in the present embodiment, a table member 64 that can be stored or deployed relative to the vehicle seat 12 is provided. The table member 64 can be used as a luggage rack by the occupant in the vehicle interior 16 in a state where the table member 64 is deployed and held at a predetermined holding position R as shown in FIG. 12B.

In addition, the table member 64 is configured such that the table 70 is arranged in front of the seat cushion 18 in the storage position of the seat cushion 18. When the seat cushion 18 is set to the storage position, a space 58 on the front side of the stored seat cushion 18 is not occupied. By arranging the wheelchair 30 (see FIG. 7) in this space 58, a wheelchair occupant seated in the wheelchair 30 can use the table 70. In this case, the wheelchair occupant can use the leg 66 of the table member 64 as a grip.

As described above, when the wheelchair occupant uses the table 70, deploying the table member 64 after the seat cushion 18 is stored is preferred. Therefore, the rotation restricting unit 32 (see FIG. 4B) may be applied instead of the rotation restricting unit 76.

Although explanation has been given regarding an example of an exemplary embodiment of the present disclosure, exemplary embodiments of the present disclosure are not limited to the above, and obviously the exemplary embodiments and various modified examples may be employed in appropriate combinations, or various embodiments may be implemented within a range not departing from the spirit of the present disclosure.

What is claimed is:

1. An attachment structure comprising:
an auxiliary member configured to be disposed at an outer side in a seat width direction of a vehicle seat, wherein the vehicle seat has a seat cushion that is capable of transitioning from a seating position to a storage position that is aligned with a seat back, the auxiliary member being rotatable, about a shaft in the vehicle seat extending along the seat width direction, between a reference position at which the auxiliary member is upright along a seat vertical direction and a holding position at which the auxiliary member is rotated closer to a front side of a vehicle in a seat front-rear direction from the reference position; and
a rotation restriction unit configured to restrict rotation of the auxiliary member at the reference position in a case in which the seat cushion is at the seating position, and cease the restriction of rotation of the auxiliary member in a case in which the seat cushion is at the storage position, wherein the rotation restriction unit comprises:
an abutment member at a lower side in the seat vertical direction than the shaft of the auxiliary member in a case in which the auxiliary member is at the reference position;
a first stopper that abuts the abutment member in a case in which the seat cushion is at the seating position, the first stopper comprising a restriction part configured to restrict rotation, to the holding position, of the auxiliary member in the reference position;
a bracket fixed to the shaft of the auxiliary member, wherein the bracket supports the abutment member movably along a longitudinal direction of the auxiliary member; and
a cam part, wherein, in a case in which the auxiliary member is rotated from the holding position to the reference position when the seat cushion is at the seating position, the cam part is abutted by the abutment member, the cam part is configured to guide the abutment member toward the restriction part, and the cam part permits rotation of the auxiliary member to the reference position.

2. The attachment structure of claim 1, wherein:
the auxiliary member is rotatable from the reference position to the holding position about the shaft in a case in which the restriction of rotation of the auxiliary member by the rotation restriction unit is ceased, and
a support part configured to support the auxiliary member at the holding position.

3. The attachment structure of claim 1, further comprising a resistance force imparting member configured to impart a resistance force to the auxiliary member in a case in which the auxiliary member is rotated.

4. The attachment structure of claim 1, wherein the auxiliary member comprises a handrail member configured to be gripped by a wheelchair occupant seated in a wheelchair that is immobilized at a position closer to the front side of the vehicle, in the seat front-rear direction, than the seat cushion when the seat cushion is at the storage position.

5. The attachment structure of claim 1, wherein the auxiliary member comprises a table member closer to the front side of the vehicle, in the seat front-rear direction, than the seat cushion when the seat cushion is at the storage position.

6. A vehicle seat, comprising:
the attachment structure of claim 1;
a seat back; and
a seat cushion configured to be flipped upward so as to be aligned with the seat back.

7. An attachment structure comprising:
an auxiliary member configured to be disposed at an outer side in a seat width direction of a vehicle seat, wherein the vehicle seat is configured to have a seat cushion that is capable of transitioning from a seating position to a storage position that is aligned with a seat back, the auxiliary member being rotatable, about a shaft in the vehicle seat extending along the seat width direction, between a reference position at which the auxiliary member is upright along a seat vertical direction and a holding position at which the auxiliary member is rotated closer to a front side of a vehicle in a seat front-rear direction from the reference position; and
a rotation restriction unit configured to restrict rotation of the auxiliary member at the reference position in a case in which the seat cushion is at the seating position, and cease the restriction of rotation of the auxiliary member in a case in which the seat cushion is at the storage position, wherein the rotation restriction unit comprises:
an abutment member at a lower side, in the seat vertical direction, than the shaft of the auxiliary member in a case in which the auxiliary member is at the reference position;
a bracket fixed to the shaft of the auxiliary member, wherein the bracket supports the abutment member movably along a longitudinal direction of the auxiliary member; and
a second stopper that, in a case in which the seat cushion at the seating position is flipped upward to the storage position, is configured to engage with the abutment member and cause the auxiliary member, via the abutment member, to rotate about the shaft from the reference position toward a front side, in the seat front-rear direction, and the second stopper is configured to support the auxiliary member at the holding position in a case in which the seat cushion has been flipped up at the storage position.

8. The attachment structure of claim 7, wherein:

the auxiliary member is rotatable from the reference position to the holding position about the shaft in a case in which the restriction of rotation of the auxiliary member by the rotation restriction unit is ceased, and a support part configured to support the auxiliary member at the holding position.

9. The attachment structure of claim 7, further comprising a resistance force imparting member configured to impart a resistance force to the auxiliary member in a case in which the auxiliary member is rotated.

10. The attachment structure of claim 7, wherein the auxiliary member comprises a handrail member configured to be gripped by a wheelchair occupant seated in a wheelchair that is immobilized at a position closer to the front side of the vehicle, in the seat front-rear direction, than the seat cushion when the seat cushion is at the storage position.

11. The attachment structure of claim 7, wherein the auxiliary member comprises a table member closer to the front side of the vehicle, in the seat front-rear direction, than the seat cushion when the seat cushion is at the storage position.

12. A vehicle seat, comprising:

the attachment structure of claim 7;

a seat back; and a seat cushion configured to be flipped upward so as to be aligned with the seat back.

* * * * *